US012720564B2

(12) United States Patent
Yuan et al.

(10) Patent No.: US 12,720,564 B2
(45) Date of Patent: Aug. 25, 2026

(54) BEAM INDICATION TO RS

(71) Applicant: QUALCOMM Incorporated, San Diego, CA (US)

(72) Inventors: Fang Yuan, Beijing (CN); Tianyang Bai, Mountain View, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 366 days.

(21) Appl. No.: 18/286,343

(22) PCT Filed: Jun. 25, 2021

(86) PCT No.: PCT/CN2021/102368

§ 371 (c)(1),
(2) Date: Oct. 10, 2023

(87) PCT Pub. No.: WO2022/267002

PCT Pub. Date: Dec. 29, 2022

(65) Prior Publication Data

US 2024/0195592 A1 Jun. 13, 2024

(51) Int. Cl.
*H04L 5/00* (2006.01)
*H04W 72/232* (2023.01)

(52) U.S. Cl.
CPC ........... *H04W 72/232* (2023.01); *H04L 5/001* (2013.01); *H04L 5/0048* (2013.01); *H04L 5/0053* (2013.01); *H04L 5/0094* (2013.01)

(58) Field of Classification Search
CPC .... H04W 72/232; H04L 5/001; H04L 5/0048; H04L 5/0094; H04L 5/0023
See application file for complete search history.

(56) References Cited

U.S. PATENT DOCUMENTS

| | | | | |
|---|---|---|---|---|
| 11,088,891 | B1 * | 8/2021 | Banin | H04B 17/14 |
| 11,172,513 | B2 | 11/2021 | Zhou et al. | |
| 2019/0199481 | A1 * | 6/2019 | Hosseini | H04L 1/1854 |

(Continued)

FOREIGN PATENT DOCUMENTS

| | | | | |
|---|---|---|---|---|
| CN | 112771807 | A | 5/2021 | |
| CN | 112997442 | * | 6/2021 | H04L 5/0048 |

(Continued)

OTHER PUBLICATIONS

3GPP TSG-RAN WG1 Meeting#110, R1-2206255 Title:Correction on activated TCI state in Unified TCI framework (Year: 2022).*

(Continued)

*Primary Examiner* — Christopher M Crutchfield
*Assistant Examiner* — Abusayeed M Haque
(74) *Attorney, Agent, or Firm* — Procopio, Cory, Hargreaves & Savitch LLP

(57) ABSTRACT

To facilitate TCI state update and activation to provide common QCL information, methods, apparatuses, and computer-readable storage medium are provided. An example method includes transmitting, to a base station, an indication of a UE capability associated with a unified transmission configuration indicator (TCI) indication to one or more reference signals (RSs). The example method further includes communicating with the base station based in part on the UE capability.

28 Claims, 16 Drawing Sheets

(56) References Cited

U.S. PATENT DOCUMENTS

| | | | | |
|---|---|---|---|---|
| 2020/0014569 | A1* | 1/2020 | Huang | H04W 8/24 |
| 2020/0145158 | A1 | 5/2020 | Zhou et al. | |
| 2020/0351674 | A1* | 11/2020 | Zhou | H04W 72/21 |
| 2021/0028843 | A1* | 1/2021 | Zhou | H04B 7/063 |
| 2021/0185664 | A1 | 6/2021 | Venugopal et al. | |
| 2023/0132212 | A1* | 4/2023 | Gao | H04L 1/1812 370/329 |
| 2023/0261833 | A1 | 8/2023 | Zhu et al. | |

FOREIGN PATENT DOCUMENTS

| | | | | |
|---|---|---|---|---|
| EP | 3713130 | A1 * | 9/2020 | H04W 72/23 |
| WO | 2020102254 | | 5/2020 | |
| WO | WO-2021096402 | A1 * | 5/2021 | H04B 17/328 |

OTHER PUBLICATIONS

International Search Report and Written Opinion—PCT/CN2021/102368—ISA/EPO—Jan. 10, 2022.

Samsung: "Moderator Summary for Multi-Beam Enhancement: Round 1", 3GPP TSG RAN WG1 #105-e, R1-2106086, e-Meeting, May 10, 2021-May 27, 2021, 17 Pages, May 21, 2021(May 21, 2021) the whole document.

Supplementary European Search Report—EP219464963—Search Authority—The Hague—Feb. 7, 2025.

* cited by examiner

BEAM INDICATION TO RS

CROSS-REFERENCE TO RELATED APPLICATION

This application is a National Stage Application filed under 35 U.S.C. § 371 of PCT International Application Serial No. PCT/CN2021/102368 entitled "BEAM INDICATION TO RS," and filed on Jun. 25, 2021, which is expressly incorporated by reference herein in its entirety.

TECHNICAL FIELD

The present disclosure relates generally to communication systems, and more particularly, to wireless communication systems with transmission configuration indicator (TCI) and reference signals (RSs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE)

are provided. The apparatus may include a memory and at least one processor coupled to the memory. The memory and the at least one processor coupled to the memory may be configured to transmit, to a base station, an indication of a UE capability associated with a unified TCI indication to one or more RSs. The memory and the at least one processor coupled to the memory may be further configured to communicate, with the base station, based in part on the UE capability. The memory and the at least one processor coupled to the memory may be further configured to receive, from a base station, an indication representing whether a RS is a target of a unified TCI indicated by DCI. The memory and the at least one processor coupled to the memory may be further configured to communicate, with the base station, based on the indication.

In another aspect of the disclosure, a method, a computer-readable medium, and an apparatus at a base station are provided. The apparatus may include a memory and at least one processor coupled to the memory. The memory and the at least one processor coupled to the memory may be configured to receive, from a UE, an indication of a UE capability associated with a unified TCI indication to one or more RSs. The memory and the at least one processor coupled to the memory may be further configured to communicate, with the UE, based in part on the UE capability. The memory and the at least one processor coupled to the memory may be further configured to transmit, to a UE, an indication representing whether a RS is a target of a unified TCI indicated by DCI. The memory and the at least one processor coupled to the memory may be further configured to communicate, with the UE, based on the indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
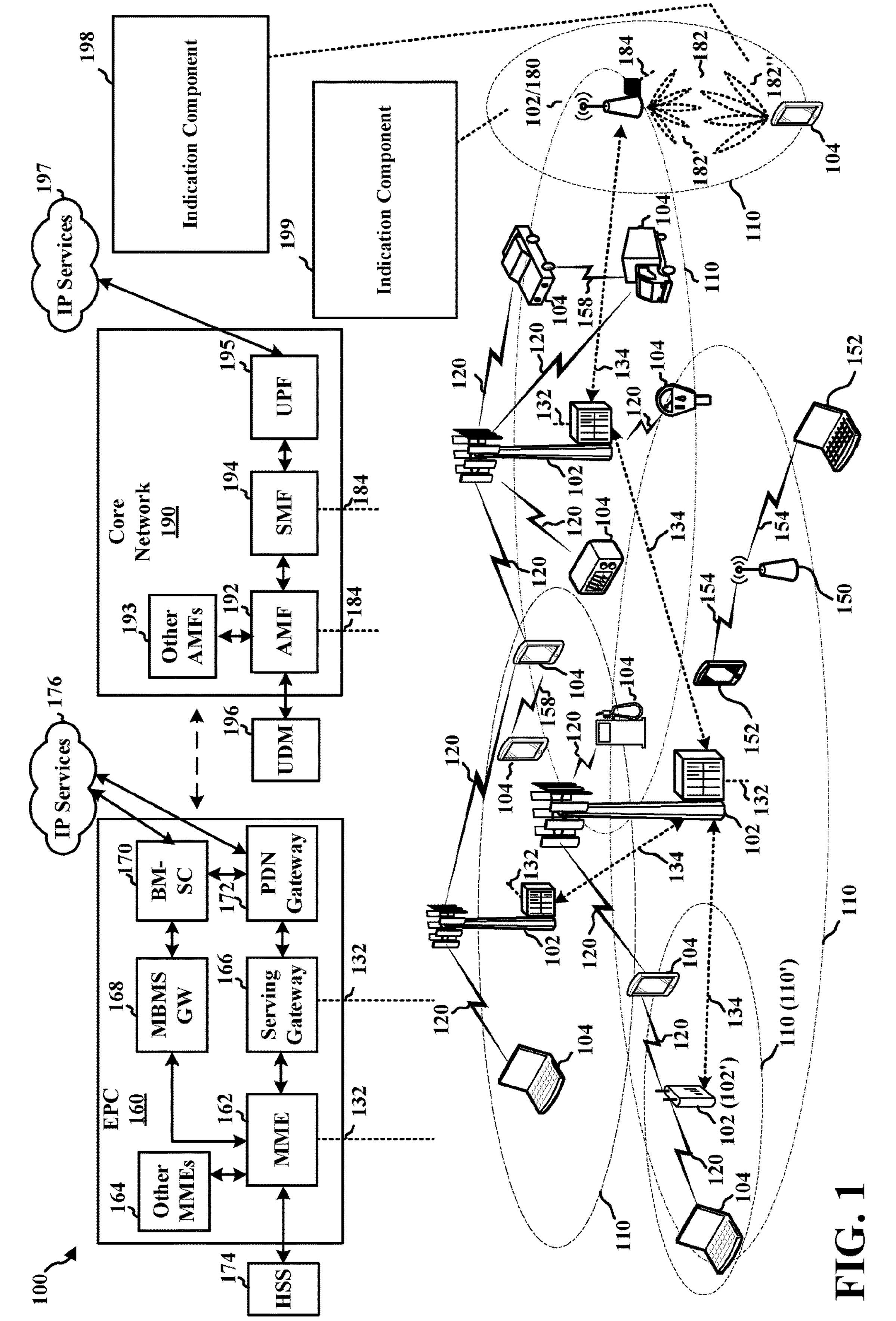
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from abase station 102 to a UE 104. The communication links 120 may use multiple-input and multiple-output (IMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include an indication component 198. In some aspects, the indication component 198 may be configured to transmit, to a base station, an indication of a UE capability associated with a unified TCI indication to one or more RSs. In some aspects, the indication component 198 may be further configured to receive, from the base station, one or more candidate sets of PC parameters associated with the set of BWPs or CCs. In some aspects, the indication component 198 may be further configured to communicate, with the base station, based in part on the UE capability. In some aspects, the indication component 198 may be configured to receive, from a base station, an indication representing whether a RS is a target of a unified TCI indicated by DCI. In some aspects, the indication component 198 may be further configured to communicate, with the base station, based on the indication.

In certain aspects, the base station 180 may include an indication component 199. In some aspects, the indication component 199 may be configured to transmit, to a base station, an indication of a UE capability associated with a unified TCI indication to one or more RSs. In some aspects, the indication component 199 may be further configured to receive, from the UE, one or more candidate sets of PC parameters associated with the set of BWPs or CCs. In some aspects, the indication component 198 may be further configured to communicate, with the UE, based in part on the UE capability. In some aspects, the indication component 199 may be configured to transmit, to the UE, an indication representing whether a RS is a target of a unified TCI indicated by DCI. In some aspects, the indication component 199 may be further configured to communicate, with the UE, based on the indication.

Although the following description may be focused on 5G NR, the concepts described herein may be applicable to other similar areas, such as LTE, LTE-A, CDMA, GSM, and other wireless technologies.

Figures 2A, 2B, 2C, 2D:
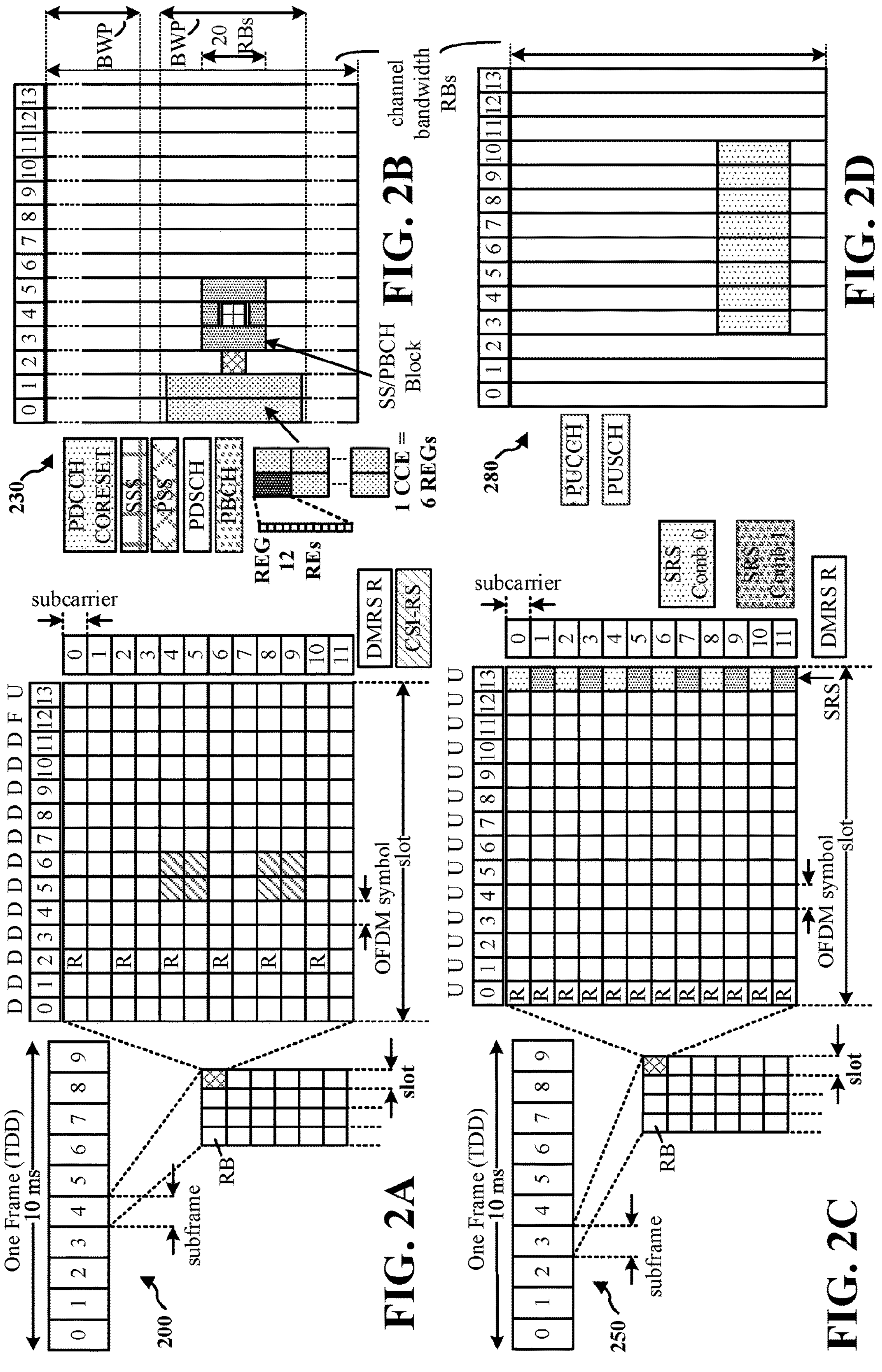
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

| 7 | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 29 slots/subframe. The subcarrier spacing may be equal to $2^{\mu}$*15 kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
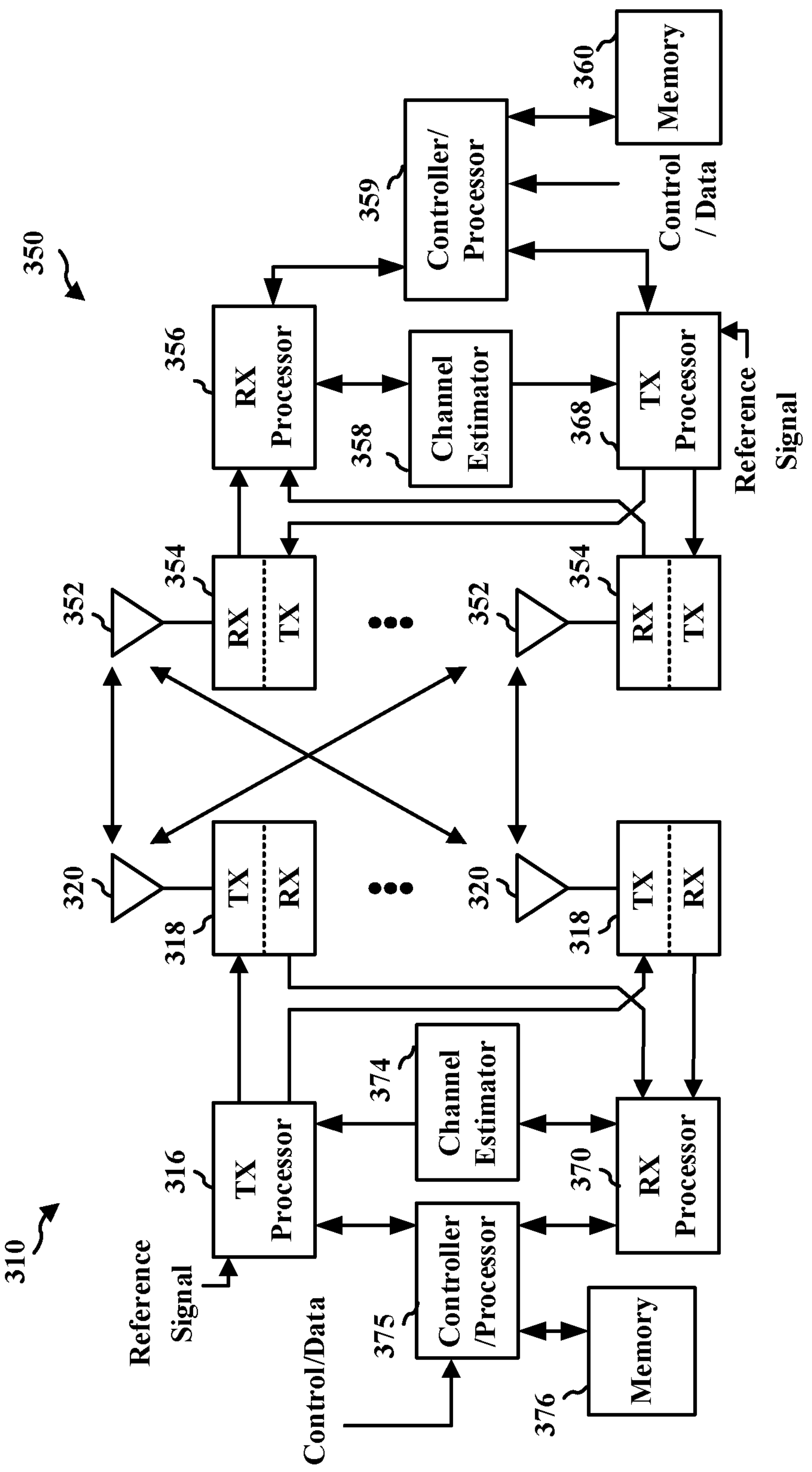
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the indication component 198 of FIG. 1.

At least one of the TX processor 316, the RX processor 370, and the controller/processor 375 may be configured to perform aspects in connection with the indication component 199 of FIG. 1.

Figure 4:
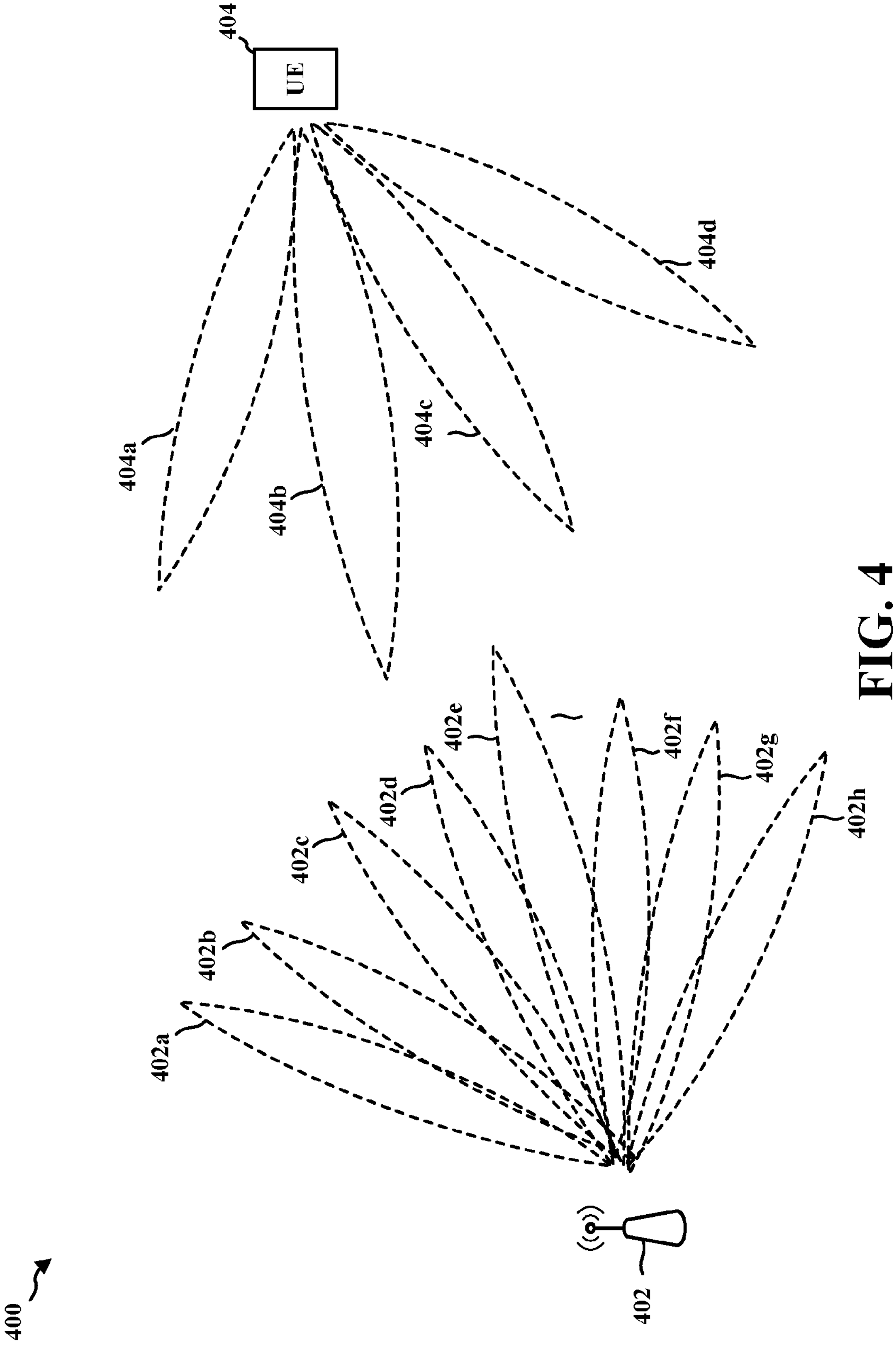
FIG. 4 is a diagram illustrating a base station in communication with a UE via a set of beams.

FIG. 4 is a diagram 400 illustrating a base station 402 in communication with a UE 404. Referring to FIG. 4, the base station 402 may transmit a beamformed signal to the UE 404 in one or more of the directions 402*a*, 402*b*, 402*c*, 402*d*, 402*e*, 402*f*, 402*g*, 402*h*. The UE 404 may receive the beamformed signal from the base station 402 in one or more receive directions 404*a*, 404*b*, 404*c*, 404*d*. The UE 404 may also transmit a beamformed signal to the base station 402 in one or more of the directions 404*a*-404*d*. The base station 402 may receive the beamformed signal from the UE 404 in one or more of the receive directions 402*a*-402*h*. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same. The term beam may be otherwise referred to as "spatial filter". Beamforming may be otherwise referred to as "spatial filtering".

In response to different conditions, the UE 404 may determine to switch beams, e.g., between beams 402*a*-402*h*. The beam at the UE 404 may be used for reception of downlink communication and/or transmission of uplink communication. In some examples, the base station 402 may send a transmission that triggers a beam switch by the UE 404. A TCI state may include Quasi co-location (QCL) information that the UE can use to derive timing/frequency error and/or transmission/reception spatial filtering for transmitting/receiving a signal. Two antenna ports are said to be quasi co-located if properties of the channel over which a symbol on one antenna port is conveyed can be inferred from the channel over which a symbol on the other antenna port is conveyed The base station may indicate a TCI state to the UE as a transmission configuration that indicates QCL relationships between one signal (e.g., a reference signal) and the signal to be transmitted/received. For example, a TCI state may indicate a QCL relationship between DL RSs in one RS set and PDSCH/PDCCH DM-RS ports. TCI states can provide information about different beam selections for the UE to use for transmitting/receiving various signals. For example, the base station 402 may indicate a TCI state change, and in response, the UE 404 may switch to a new beam according to the new TCI state indicated by the base station 402.

In some wireless communication systems, such as a wireless communication system under a unified TCI framework, a pool of joint DL/UL TCI states may be used for joint DL/UL TCI state updates for beam indication. For example, the base station 402 may transmit a pool of joint DL/UL TCI states to the UE 404. The UE 404 may determine to switch transmission beams and/or reception beams based on the joint DL/UL TCI states. In some aspects, the TCI state pool for separate DL and UL TCI state updates may be used. In some aspects, the base station 402 may use RRC signaling to configure the TCI state pool. In some aspects, the joint TCI may or may not include UL specific parameter(s) such as UL PC/timing parameters, PLRS, panel-related indication, or the like. If the joint TCI includes the UL specific parameter(s), the parameters may be used for the UL transmission of the DL and UL transmissions to which the joint TCI is applied.

Under a unified TCI framework, different types of common TCI states may be indicated. For example, a type 1 TCI may be a joint DL/UL common TCI state to indicate a common beam for at least one DL channel or RS and at least one UL channel or RS. A type 2 TCI may be a separate DL (e.g., separate from UL) common TCI state to indicate a common beam for more than one DL channel or RS. A type 3 TCI may be a separate UL common TCI state to indicate a common beam for more than one UL channel/RS. A type 4 TCI may be a separate DL single channel or RS TCI state to indicate a beam for a single DL channel or RS. A type 5 TCI may be a separate UL single channel or RS TCI state to indicate a beam for a single UL channel or RS. A type 6 TCI may include UL spatial relation information (e.g., such as sounding reference signal (SRS) resource indicator (SRI)) to indicate a beam for a single UL channel or RS. An example RS may be an SSB, a tracking reference signal (TRS) and associated CSI-RS for tracking, a CSI-RS for beam management, a CSI-RS for CQI management, a DM-RS associated with non-UE-dedicated reception on PDSCH and a subset (which may be a full set) of control resource sets (CORESETs), or the like.

A TCI state may be defined to represent at least one source RS to provide a reference (e.g., UE assumption) for determining quasi-co-location (QCL) or spatial filters. For example, a TCI state may define a QCL assumption between a source RS and a target RS.

To accommodate situations where beam indication for UL and DL are separate, two separate TCI states (one for DL and another one for UL) may be utilized. For a separate DL TCI, the source reference signal(s) in M (M being an integer) TCIs may provide QCL information at least for UE-dedicated reception on PDSCH and for UE-dedicated reception on all or subset of CORESETs in a CC. For a separate UL TCI, the source reference signal(s) in N (N being an integer) TCIs provide a reference for determining common UL transmission (TX) spatial filter(s) at least for dynamic-grant or configured-grant based PUSCH and all or subset of dedicated PUCCH resources in a CC.

In some aspects, the UL TX spatial filter may also apply to all SRS resources in resource set(s) configured for antenna switching, codebook-based, or non-codebook-based UL transmissions.

In some aspects, each of the following DL RSs may share the same indicate TCI state as UE-dedicated reception on PDSCH and for UE-dedicated reception on all or subset of CORESETs in a CC: CSI-RS resources for CSI, some or all CSI-RS resources for beam management, CSI-RS for tracking, and DM-RS(s) associated with UE-dedicated reception on PDSCH and all/subset of CORESETs. Some SRS resources or resource sets for beam management may share the same indicated TCI state as dynamic-grant/configured-grant based PUSCH, all or subset of dedicated PUCCH resources in a CC. In some wireless communication systems, several QCL rules may be defined. For example, a first rule may define that TCI to DM-RS of UE dedicated PDSCH and PDCCH may not have SSB as a source RS to provide QCL type D information. A second rule may define that TCI to some DL RS such as CSI-RS may have SSB as a source RS to provide QCL type D information. A third rule may define that TCI to some UL RS such as SRS can have SSB as a source RS to provide spatial filter information. Example aspects provided herein enable a UE to signal capability of applying unified TCI to RS, provide QCL indication to DL RS, and provide hybrid spatial filter indication to UL RS.

In some wireless communication systems, to facilitate a common TCI state ID update and activation to provide common QCL information at least for UE-dedicated PDCCH/PDSCH (e.g., common to UE-dedicated PDCCH and UE-dedicated PDSCH) or common UL TX spatial filter(s) at least for UE-dedicated PUSCH/PUCCH across a set of configured CCs/BWPs (e.g., common to multiple PUSCH/PUCCH across configured CCs/BWPs), several configurations may be provided. For example, the RRC-configured TCI state pool(s) may be configured as part of the PDSCH configuration (such as in a PDSCH-Config parameter) for each BWP or CC. The RRC-configured TCI state pool(s) may be absent in the PDSCH configuration for each BWP/CC, and may be replaced with a reference to RRC-configured TCI state pool(s) in a reference BWP/CC. For a BWP/CC where the PDSCH configuration contains a reference to the RRC-configured TCI state pool(s) in a reference BWP/CC, the UE may apply the RRC-configured TCI state pool(s) in the reference BWP/CC. When the BWP/CC identifier (ID) (e.g., for a cell) for QCL-Type A or Type D source RS in a QCL information (such as in a QCL info parameter) of the TCI state is absent, the UE may assume that QCL-Type A or Type D source RS is in the BWP/CC to which the TCI state applies. In addition, a UE may report a UE capability indicating a maximum number of TCI state pools that the UE can support across BWPs and CCs in a band.

Before receiving a TCI state, a UE may assume that the antenna ports of one DM-RS port group of a PDSCH are spatially QCL'd with an SSB determined in the initial access procedure with respect to one or more of: a Doppler shift, a Doppler spread, an average delay, a delay spread, a set of spatial Rx parameters, or the like. After receiving the new TCI state, the UE may assume that the antenna ports of one DM-RS port group of a PDSCH of a serving cell are QCL'd with the RS(s) in the RS set with respect to the QCL type parameter(s) given by the indicated TCI state. Regarding the QCL types, QCL type A may include the Doppler shift, the Doppler spread, the average delay, and the delay spread; QCL type B may include the Doppler shift and the Doppler spread; QCL type C may include the Doppler shift and the average delay; and QCL type D may include the spatial Rx parameters (e.g., associated with beam information such as beamforming properties for finding a beam). In some aspects, a maximum number of TCI states may be 128.

In some aspects, a UE may receive a signal, from a base station, configured to trigger a TCI state change via, for example, a medium access control (MAC) control element (CE) (MAC-CE), a downlink control information (DCI), or a radio resource control (RRC) signal. The TCI state change may cause the UE to find the best or most suitable UE receive beam corresponding to the TCI state indicated by the base station, and switch to such beam. Switching beams may allow for an enhanced or improved connection between the UE and the base station by ensuring that the transmitter and receiver use the same configured set of beams for communication.

In some aspects, a spatial relation change, such as a spatial relation update, may trigger the UE to switch beams. Beamforming may be applied to uplink channels, such as a PUSCH, a PUCCH, or an SRS. Beamforming may be based on configuring one or more spatial relations between the uplink and downlink signals. Spatial relation indicates that a UE may transmit the uplink signal using the same beam used for receiving the corresponding downlink signal.

In another aspect, the base station 402 may indicate a change in a PLRS that the UE may use to determine power control for uplink transmissions, such as a PUSCH, a PUCCH, or an SRS. In response to the change in the PLRS, the UE 404 may determine to switch to a new beam.

Some wireless communication systems may use codebook-based MIMO. MIMO systems may allow multiple independent radio terminals, each of which has one or multiple antennas that communicate with a given access point in such a way that each radio terminal can fully utilize all the spectral resources simultaneously. A MIMO system (such as the base station 402) may employ a procedure, such as precoding, to resolve the problem of interference among the signals transmitted from an access point to the multiple terminals in the same frequency band at the same time.

In a codebook-based MIMO wireless communication systems, the precoding may be selected from a standardized codebook. In a non-codebook-based IMO, there may be no such codebook and the precoding may be dynamically determined. For some non-codebook-based MIMO in a PUSCH, an SRI field in DCI may indicate a set of precoders associated with an SRS resource set and a set of power control (PC) parameters which may include P0, alpha, closed loop index (which may be referred to as "Closedloopindex"), PLRS, or the like. P0 may represent a base station received power per resource block assuming a path loss of 0 decibels (dB). Alpha may represent possible values for uplink power control. Closedloopindex may be an index of the closed power control loop associated with the SRI and the associated PUSCH. A beam of the PUSCH may follow the SRS resource set. For example, all SRSs in the same SRS resource set may have a same beam and the SRI may not select a beam.

For some codebook-based MIMO in a PUSCH, an SRI field in DCI may select an SRS resource from multiple SRSs in an SRS resource set for determining a beam for PUSCH transmission. For example, different SRS selected by SRI in the SRS resource set may have different beams. A transmitted precoding matrix indicator (TPMI) in DCI may indicate precoders and the SRI field may indicate a set of power control parameters which may also include P0, alpha, Closedloopindex, PLRS, or the like.

Figure 5:
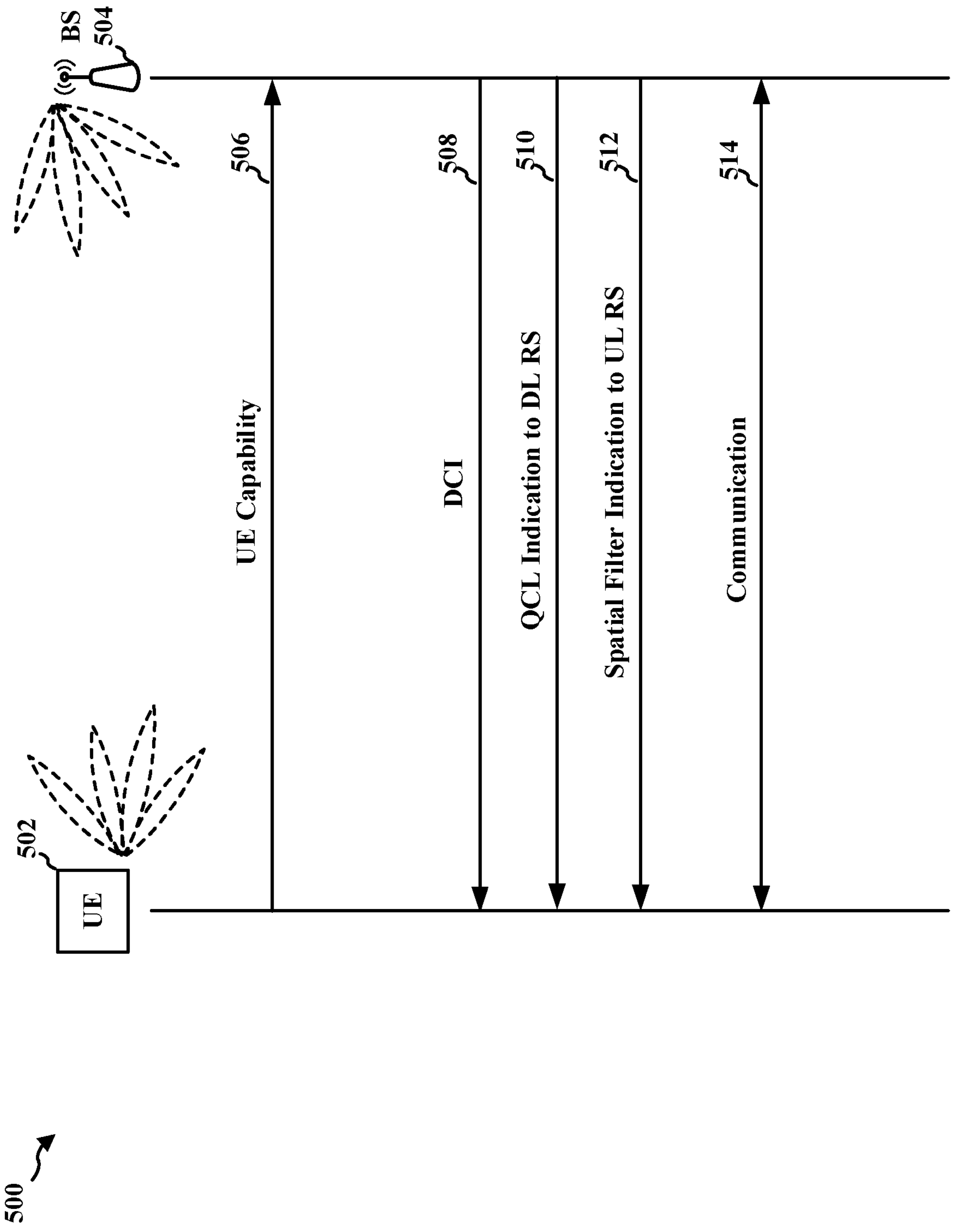
FIG. 5 is a diagram illustrating example communications between a UE and a base station.

FIG. 5 is a diagram 500 illustrating example communications between a UE 502 and a base station 504. As illustrated in FIG. 5, the UE 502 may transmit a UE capability 506 representing capability of applying unified TCI to RS to a base station 504. For example, the UE 502 may support indicating the UE capability 506 on unified TCI indication to reference signals. In some aspects, the UE capability 506 may include a first capability that represents whether the one or more DL RS types may share the same indicated unified TCI state as UE-dedicated reception on PDSCH and for UE-dedicated reception on all or subset of CORESETs in a CC. The one or more DL RS types may include a first RS associated with CSI-RS resources for CSI acquisition, e.g., configured without higher layer parameter "trs-Info" and without the higher layer parameter "repetition". The one or more DL RS types may include a second RS associated with CSI-RS resources for beam management, e.g., configured without higher layer parameter "trs-Info" and with the higher layer parameter "repetition". The one or more DL RS types may include a third RS associated with CSI-RS for tracking, e.g., configured with higher layer parameter "trs-Info". The one or more DL RS types may include a fourth RS associated with DM-RS associated with reception on non-UE-dedicated PDSCH and a subset (e.g., full set or a portion) of non-UE-dedicated CORESETs. The UE capability may be indicated per RS type or may be indicated jointly for multiple RS types. If a UE may not support the UE capability, UE may not be indicated with a unified TCI to the RS by a unified TCI indication field in DCI, such as the DCI 508.

In some aspects, the UE capability 506 may include a second capability that represents whether SRS resources or SRS resource sets for beam management may share a same indicated TCI state as dynamic-grant or configured-grant based PUSCH and a subset (e.g., full set or a portion) of dedicated PUCCH resources in a CC.

In some aspects, the base station 504 may transmit a DCI 508 to the UE 502 to indicate whether one or more types of RS may be a target of a unified TCI indicated by a unified TCI indication field in DCI. The one or more RS types may include a first RS associated with CSI-RS resources for CSI acquisition, e.g., configured without higher layer parameter "trs-Info" and without the higher layer parameter "repetition". The one or more RS types may include a second RS associated with CSI-RS resources for beam management, e.g., configured without higher layer parameter "trs-Info" and with the higher layer parameter "repetition". The one or more RS types may include a third RS associated with CSI-RS for tracking, e.g., configured with higher layer parameter "trs-Info". The one or more RS types may include a fourth RS associated with DM-RS associated with reception on non-UE-dedicated PDSCH and a subset (e.g., full set or a portion) of non-UE-dedicated CORESETs. The indication in DCI 508 may be indicated per RS type or may be indicated jointly. In some aspects, the indication in DCI 508 may be transmitted via medium access control (MAC) control element (CE) (MAC-CE) or radio resource control (RRC) signalling.

If a RS type is indicated to be a target of the unified TCI, the UE 502 may apply the unified TCI indicated in the DCI for UE dedicated PDSCH or PDCCH to the DL RS or apply the unified TCI indicated in the DCI for UE dedicated PUSCH or PUCCH to the UL RS when exchanging communication 514 with the base station.

The base station 504 may transmit QCL indication to DL RS 510 to indicate QCL information to a DL RS. In some aspects, in a first option, the base station 504 may transmit a dedicated QCL indication by RRC, MAC-CE, or CSI-trigger in DCI signalling. For example, the base station 504 may utilize RRC signalling for periodical CSI-RS resources, MAC-CE signalling for semi-periodical CSI-RS resources, or by an associated CSI-trigger state selected by CSI-request field in DCI signalling for a periodical CSI-RS resources. The QCL indication 510 may be a unified TCI, non-unified TCI, or QCL information elements of different QCL types. If the QCL indication 510 is a unified TCI, the indication may or may not be applicable to UE-dedicated reception on PDSCH and for UE-dedicated reception on all or subset of CORESETs. In some aspects, in a second option, the base station 504 may reuse TCI indication by a unified TCI indication field in DCI for UE-dedicated reception on PDSCH and for UE-dedicated reception on all or subset of CORESETs in a CC. If a RS type is indicated to be a target of the unified TCI, the UE 502 may apply the unified TCI to the RS, and the unified TCI may be indicated in the TCI field of DCI for UE dedicated PDSCH or PDCCH to the DL RS or for UE dedicated PUSCH or PUCCH to the UL RS. In some aspects, whether to use the first option or the second option may be based on any of RRC configuration, time domain configuration, or UE capability (e.g., the UE capability 506). For example, when no QCL is explicitly configured to a DL RS, the second option may be applied. In another example the base station may RRC configures a CSI RS or a set to have the TCI indication based on the first option or the second option. In another example, the base station 504 may apply the first option of RRC signalling to periodical CSI-RS resources, the second option to semi-periodical CSI-RS resources, and the second option of CSI-trigger in DCI to a periodical CSI-RS resources.

The base station 504 may transmit spatial filter information to a UL RS 512 to indicate QCL information to a DL RS to the UE 502. In some aspects, as a first option, the base station 504 may use dedicated beam indication by RRC or MAC-CE signalling. For example, the base station may use RRC signalling for periodical SRS resources, IAC-CE signalling for semi-periodical or a periodical SRS resources. The spatial filter information 512 may be a TCI state ID such as a UL TCI state or joint TCI, or a spatial RS ID such as CSI-RS, SSB, SRS ID. If the spatial filter information 512 is a unified TCI, the indication may or may not be applicable to UE-dedicated reception on PDSCH and for UE-dedicated reception on all or subset of CORESETs. In some aspects, as a second option, the base station 504 may reuse TCI indication by a unified TCI indication field in DCI for UE-dedicated reception on PUSCH and for UE-dedicated reception on all or subset of PUCCHs in a CC. If a RS type is indicated to be a target of the unified TCI, the UE 502 may apply the unified TCI to the RS, and the unified TCI may be indicated in the TCI field of DCI for UE dedicated PDSCH or PDCCH to the DL RS or for UE dedicated PUSCH or PUCCH to the UL RS. In some aspects, the base station 504 may apply the first option or the second option based on RRC configuration, time configuration, or UE capability (such as the UE capability 506). For example, when beam indication is not explicitly configured to SRS Resources, the second option may be applied. As another example, the base station 504 may RRC configure a SRS or a set to have beam indication to use the first option or the second option. In another example, the base station 504 may apply the first option of RRC signalling to periodical SRS resources, the second option to semi-periodical SRS resources or a periodical SRS resources, or the like.

Based on the UE capability 506, the DCI 508, the QCL indication 510, and the spatial filter indication 512, the UE 502 and the base station 504 may exchange communication 514 with each other. By way of example, the communication 514 may be a PDCCH, a PDSCH, a PUSCH, or a PUCCH.

Figures 6A, 6B:
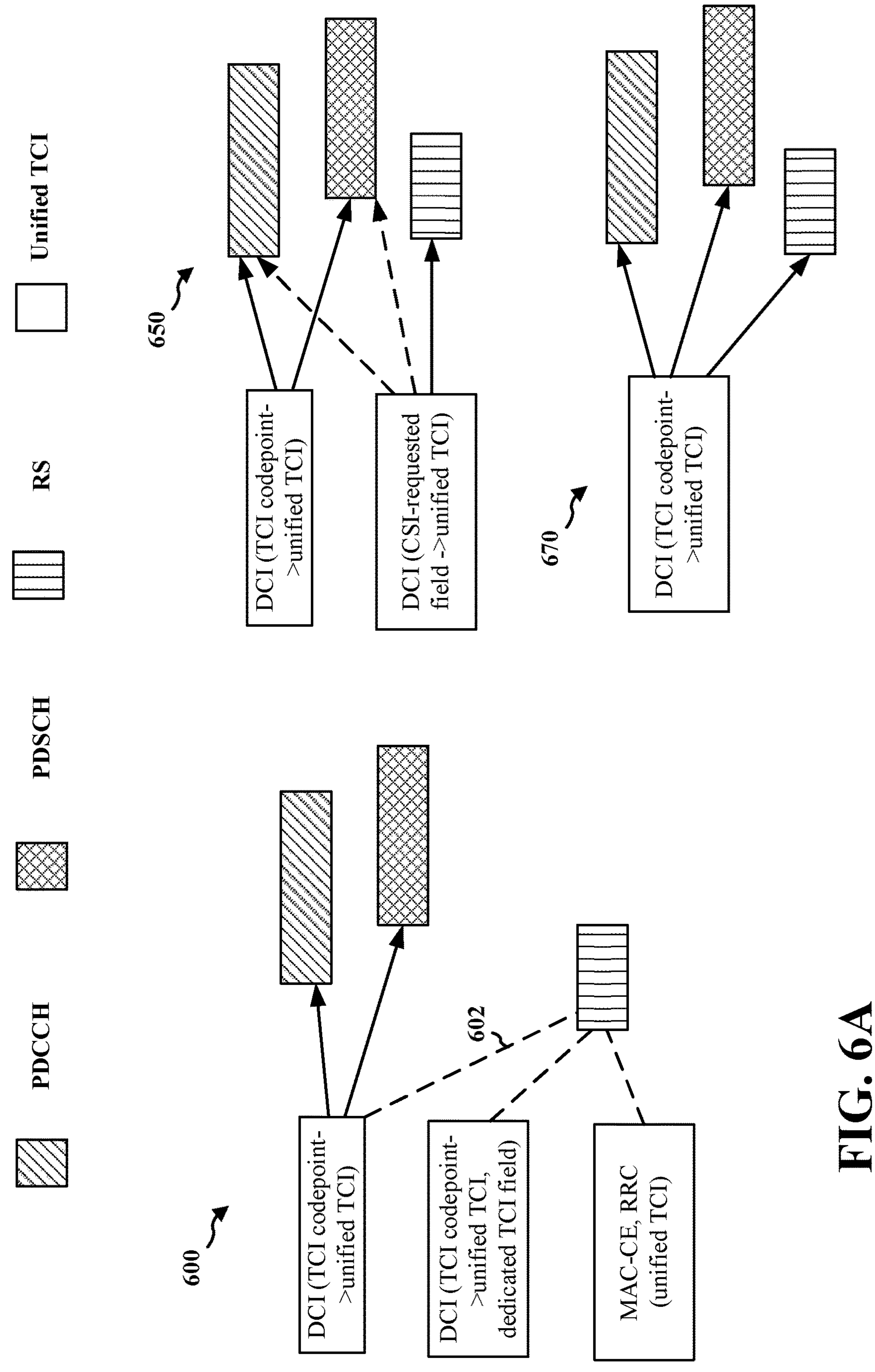
FIGS. 6A and 6B are diagrams illustrating example TCI indication.

FIGS. 6A and 6B are diagrams illustrating example TCI indication. As illustrated in example 600 of FIG. 6A, the UE capability 506 may represent 602 regarding whether unified TCI in a DCI may be applicable to RSs. As illustrated in example 650 of FIG. 6B, if the QCL indication 510 is a unified TCI, the indication may or may not be applicable to UE-dedicated reception on PDSCH and for UE-dedicated reception on all or subset of CORESETs. As illustrated in example 670 of FIG. 6B, in some aspects, the base station 504 may reuse TCI indication by a unified TCI indication field in DCI for UE-dedicated reception on PDSCH and for UE-dedicated reception on all or subset of CORESETs in a CC.

Figure 7:
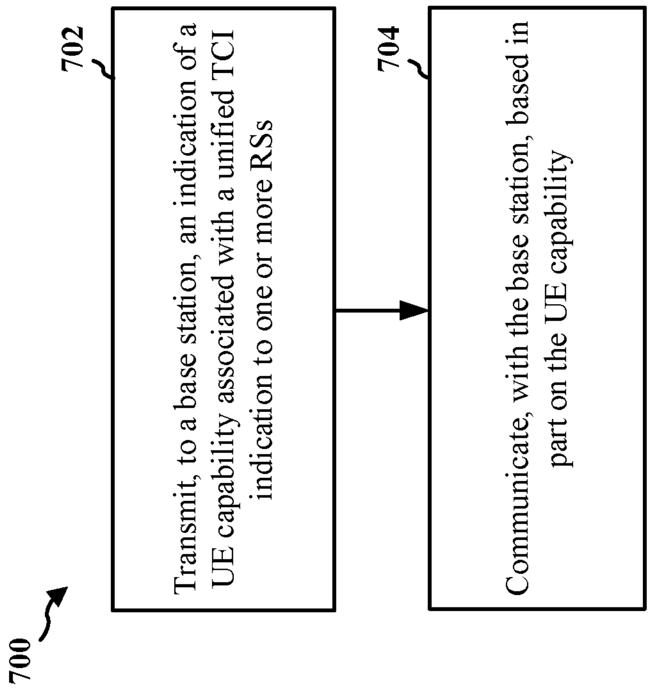
FIG. 7 is a flowchart of a method of wireless communication.

FIG. 7 is a flowchart 700 of a method of wireless communication. The method may be performed by a UE (e.g., the UE 104, the UE 404, the UE 502; the apparatus 1102). The method may be used for QCL indication to RS to improve communication quality between a UE and a base station.

At 702, the UE may transmit, to a base station, an indication of a UE capability associated with a unified TCI indication to one or more RSs. For example, the UE 502 may transmit, to a base station 504, an indication of a UE capability 506 associated with a unified TCI indication to one or more RSs. In some aspects, 702 may be performed by indication component 1142 in FIG. 11.

At 704, the UE may communicate, with the base station, based in part on the UE capability. For example, the UE 502 may communicate, with the base station 504, based in part on the UE capability. In some aspects, 704 may be performed by communication component 1144 in FIG. 11.

Figure 8:
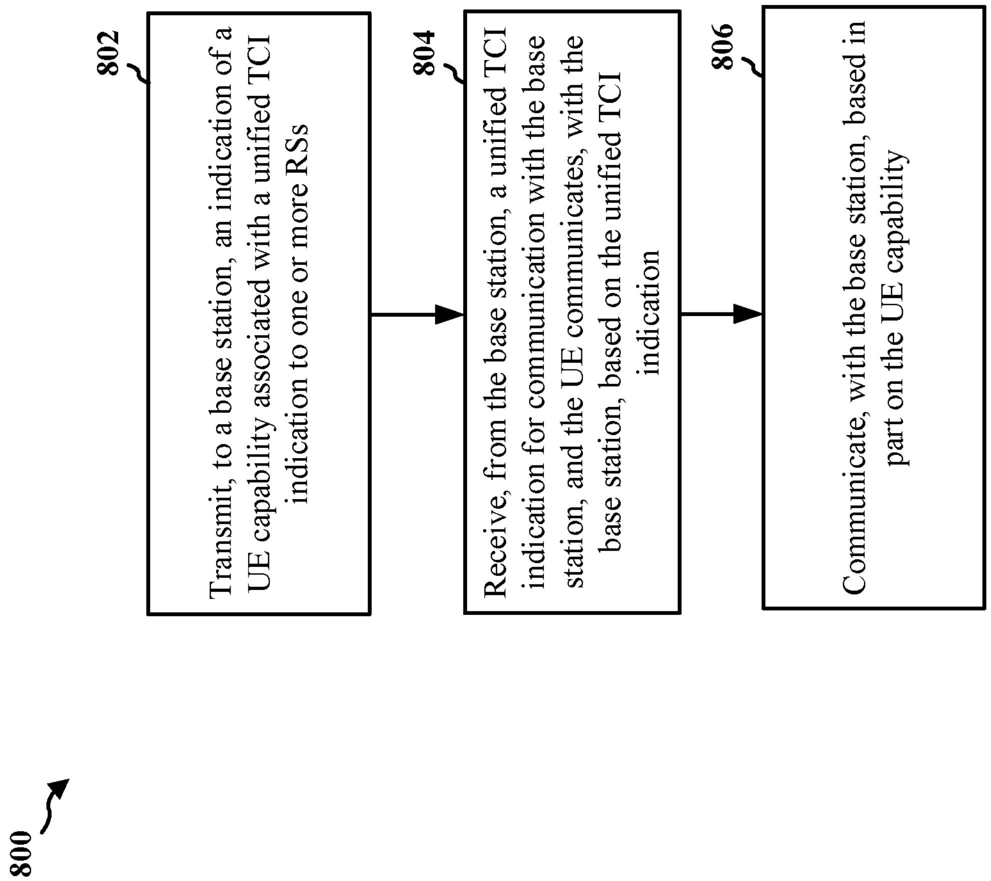
FIG. 8 is a flowchart of a method of wireless communication.

FIG. 8 is a flowchart 800 of a method of wireless communication. The method may be performed by a UE (e.g., the UE 104, the UE 404, the UE 502; the apparatus 1102). The method may be used for QCL indication to RS to improve communication quality between a UE and a base station.

At 802, the UE may transmit, to a base station, an indication of a UE capability associated with a unified TCI indication to one or more RSs. For example, the UE 502 may transmit, to a base station 504, an indication of a UE capability 506 associated with a unified TCI indication to one or more RSs. In some aspects, 802 may be performed by indication component 1142 in FIG. 11. In some aspects, the indication indicates whether the UE supports a downlink RS sharing a same indicated TCI state for UE-dedicated reception on PDSCH and UE-dedicated reception on a subset of CORESETs in a CC. In some aspects, the downlink RS is associated with one or more of: a set of CSI-RS resources for CSI acquisition configured without a higher layer parameter trs-Info or higher layer repetition, a set of CSI-RS resources for beam management configured without higher layer parameter trs-Info and with higher layer repetition, a set of CSI-RS resources for tracking configured with a higher layer parameter trs-Info, or a DM-RS associated with non-UE-dedicated reception on PDSCH and the subset of CORESETs. In some aspects, the indication indicates whether the UE supports SRS resources for beam management that share a same TCI state with dynamic grant or configured grant based PUSCH or a subset of PUCCH resources in a component carrier. In some aspects, the UE capability is associated with one RS type. In some aspects, the UE capability is associated with more than one RS type. In some aspects, the UE capability indicates non-support, and wherein the UE is not indicated with a unified TCI to the RS via DCI.

At 804, the UE may receive, from the base station, a unified TCI indication for communication with the base station, and the UE communicates, with the base station, based on the unified TCI indication. For example, the UE 502 may receive, from the base station 504, a unified TCI indication for communication with the base station, and the UE may communicate, with the base station, based on the unified TCI indication. In some aspects, 804 may be performed by indication component 1142 in FIG. 11.

At 806, the UE may communicate, with the base station, based in part on the UE capability. For example, the UE 502 may communicate, with the base station 504, based in part on the UE capability. In some aspects, 806 may be performed by communication component 1144 in FIG. 11. For example, the UE may receive indications from the base station based on the UE capability.

Figure 9:
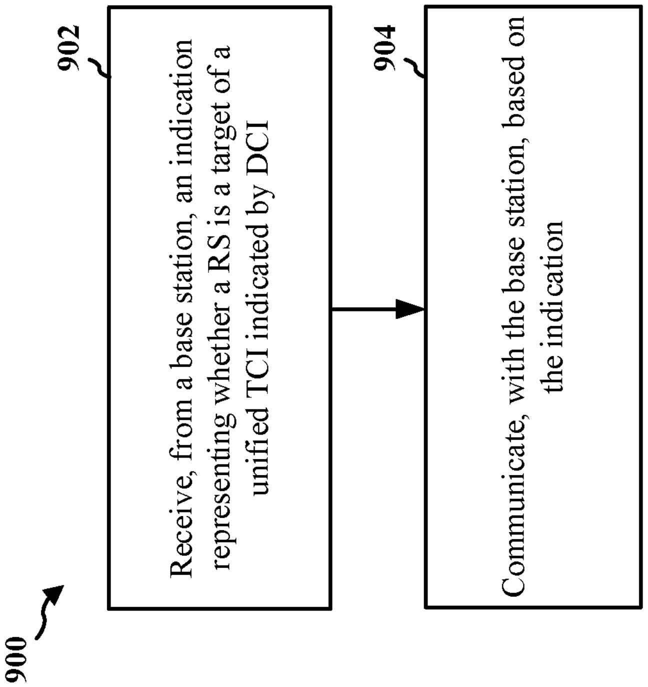
FIG. 9 is a flowchart of a method of wireless communication.

FIG. 9 is a flowchart 900 of a method of wireless communication. The method may be performed by a UE (e.g., the UE 104, the UE 404, the UE 502; the apparatus 1102). The method may be used for indicating whether a RS is a target of a unified TCI to improve communication quality between a UE and a base station.

At 902, the UE may receive, from a base station, an indication representing whether a RS is a target of a unified TCI indicated by DCI. For example, the UE 502 may receive, from a base station 504, an indication in DCI 508 representing whether a RS is a target of a unified TCI indicated by DCI. In some aspects, 902 may be performed by indication component 1142 in FIG. 11.

At 904, the UE may communicate, with the base station, based on the indication. For example, the UE 502 may communicate, with the base station 504, based on the indication. In some aspects, 904 may be performed by communication component 1144 in FIG. 11.

Figure 10:
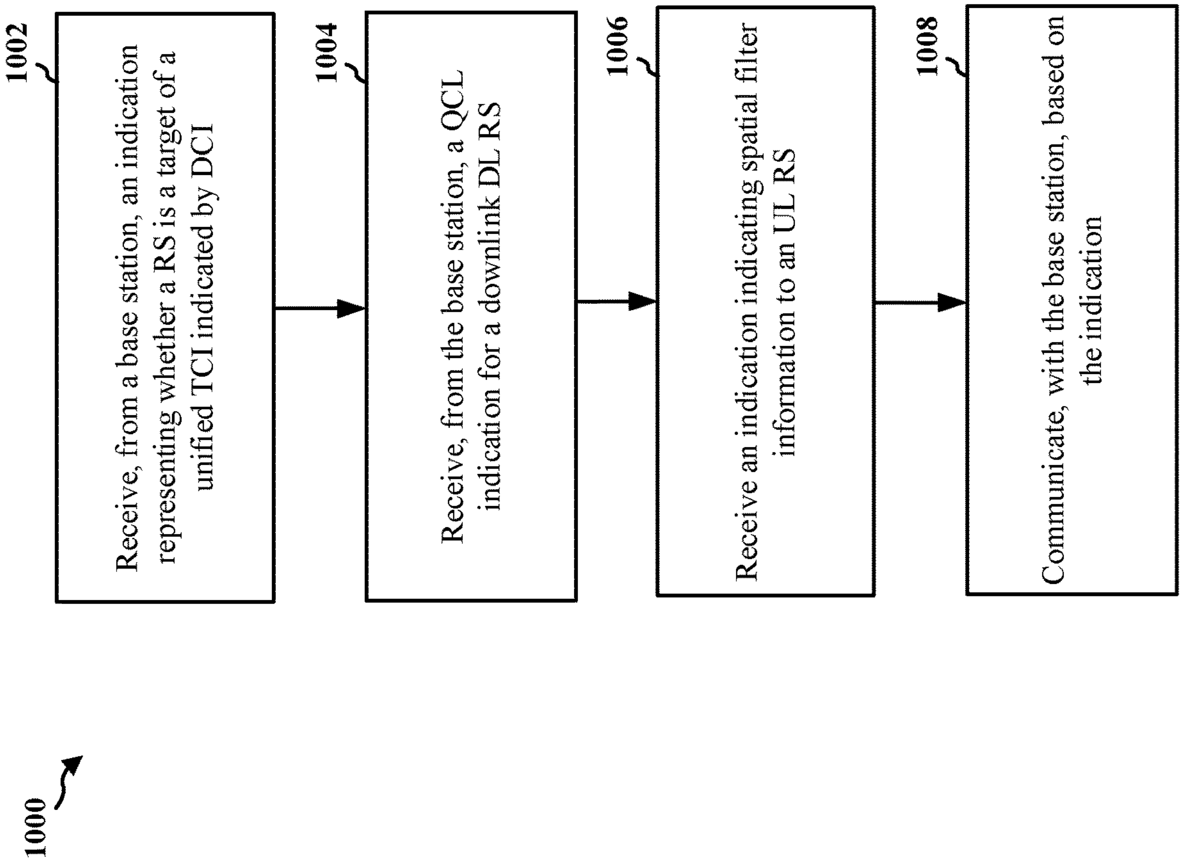
FIG. 10 is a flowchart of a method of wireless communication.

FIG. 10 is a flowchart 1000 of a method of wireless communication. The method may be performed by a UE (e.g., the UE 104, the UE 404, the UE 502; the apparatus 1102). The method may be used for indicating whether a RS is a target of a unified TCI to improve communication quality between a UE and a base station.

At 1002, the UE may receive, from a base station, an indication representing whether a RS is a target of a unified TCI indicated by DCI. For example, the UE 502 may receive, from a base station 504, an indication in DCI 508 representing whether a RS is a target of a unified TCI indicated by DCI. In some aspects, 1002 may be performed by indication component 1142 in FIG. 11. In some aspects, the indication includes a unified TCI indication field in the DCI. In some aspects, the RS includes a set of CSI-RS resources for CSI acquisition, e.g., configured without higher layer parameter trs-Info or higher layer repetition. In some aspects, the RS includes a set of CSI-RS resources for beam management, e.g., configured without higher layer parameter trs-Info and configured with higher layer repetition. In some aspects, the RS includes a set of CSI-RS resources for tracking e.g., configured with a higher layer parameter trs-Info. In some aspects, the RS includes DM-RS associated with reception on non-UE-dedicated PDSCH and the subset of non-UE-dedicated CORESETs. In some aspects, the RS includes SRS resources for beam management. In some aspects, the indication is transmitted via MAC-CE.

At 1004, the UE may receive, from a base station, a QCL indication for a downlink DL RS. For example, the UE 502 may receive, from the base station 504, a QCL indication 510 for a downlink DL RS. In some aspects, 1004 may be performed by indication component 1142 in FIG. 11. In some aspects, the indication is included in a dedicated RRC signaling for periodic CSI-RS resources, the DL RS being the periodic CSI-RS. In some aspects, the indication is included in a dedicated MAC-CE signaling for semi-periodic CSI-RS resources, the DL RS being the semi-periodic CSI-RS. In some aspects, the indication includes a CSI trigger state selected by a CSI-request field in DCI signalling for aperiodic CSI-RS resources, the DL RS being the aperiodic CSI-RS. In some aspects, the indication includes a TCI indication by a unified TCI indication field in DCI for UE-dedicated reception on PDSCH and for UE-dedicated reception on all or subset of CORESETs in a CC. In some aspects, a format of the indication is based on a RRC configuration, a time domain configuration, or a UE capability.

At 1006, the UE may receive an indication indicating spatial filter information to an UL RS. For example, the UE 502 may receive an indication indicating spatial filter information 512 to an UL RS. In some aspects, 1006 may be performed by indication component 1142 in FIG. 11. In some aspects, the indication is included in a dedicated RRC signaling for periodic CSI-RS resources, the UL RS being the periodic CSI-RS. In some aspects, the indication is included in a dedicated MAC-CE signaling for semi-periodic CSI-RS resources, the UL RS being the semi-periodic CSI-RS. In some aspects, the indication is included in a dedicated MAC-CE signaling for aperiodic CSI-RS resources, the UL RS being the aperiodic CSI-RS. In some aspects, the indication includes a TCI state ID or a spatial RS ID. In some aspects, the indication includes a TCI indication by a unified TCI indication field in DCI for UE-dedicated reception on PUSCH and for UE-dedicated reception on all or subset of CORESETs in a CC. In some aspects, a format of the indication is based on a RRC configuration, a time domain configuration, or a UE capability.

At 1008, the UE may communicate, with the base station, based on the indication. For example, the UE 502 may communicate, with the base station 504, based on the indication. In some aspects, 1008 may be performed by communication component 1144 in FIG. 11. For example, the UE may process TCI states based on the indication.

Figure 11:
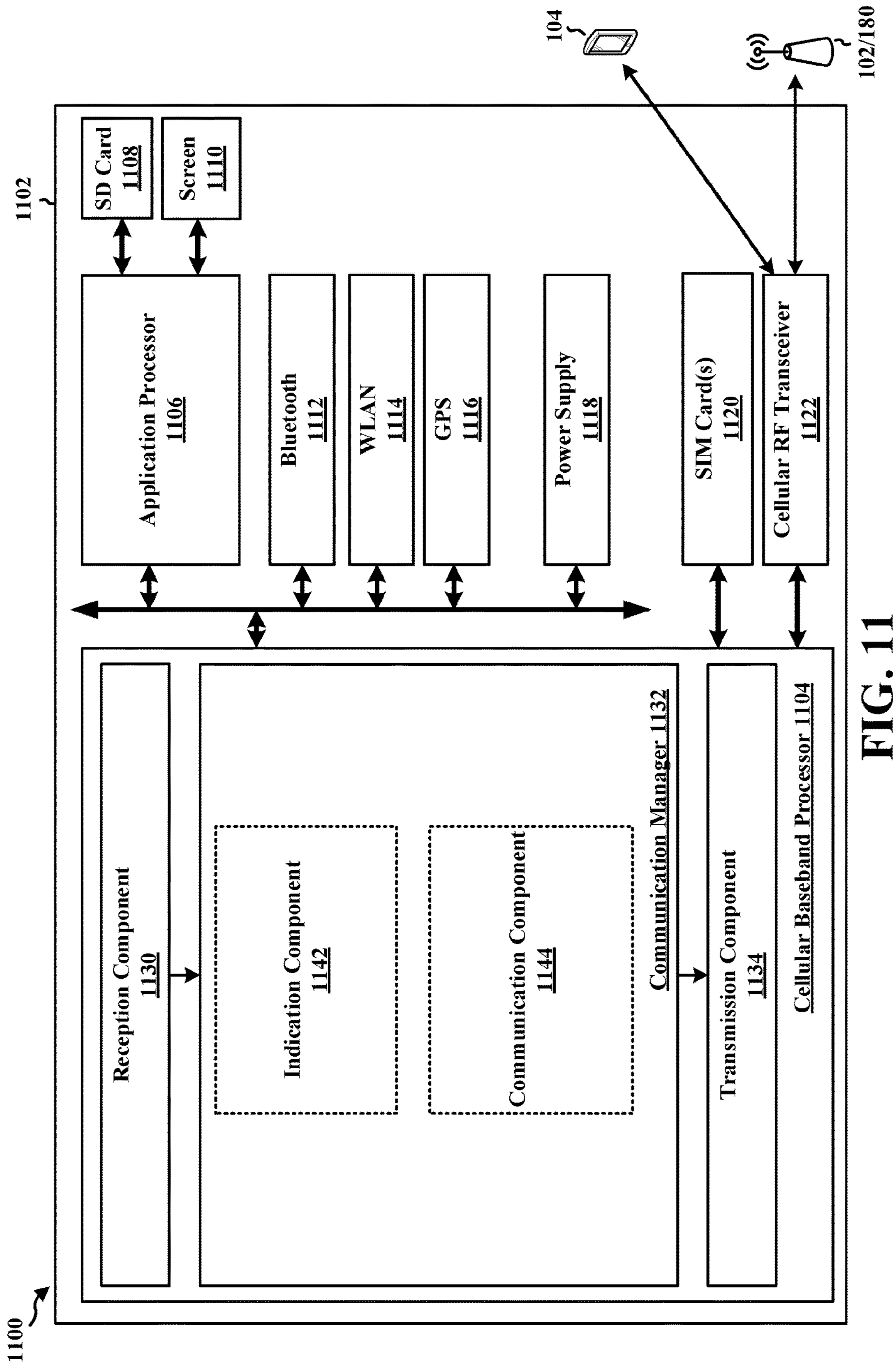
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GP S) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 may include an indication component 1142 that is configured to receive or transmit an indication, e.g., as described in connection with 702 in FIGS. 7, 802 and 804 in FIG. 8, 902 in FIG. 9, and 1002, 1004, and 1006 in FIG. 10. The communication manager 1132 may further include a communication component 1144 that may be configured to communicate with abase station based on the indication, e.g., as described in connection with 704 in FIG. 7, 806 in FIG. 8, 904 in FIG. 9, and 1008 in FIG. 10.

The apparatus may include additional components that perform each of the blocks of the algorithm in the flowcharts of FIGS. 7-10. As such, each block in the flowcharts of FIGS. 7-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, may include means for transmitting, to a base station, an indication of a UE capability associated with a unified TCI indication to one or more RSs. The cellular base band processor 1104 may further include means for communicating, with the base station, based in part on the UE capability. The cellular base band processor 1104 may further include means for receiving, from the base station, a unified TCI indication for communication with the base station, and the UE communicates, with the base station, based on the unified TCI indication. The cellular base band processor 1104 may further include means for receiving, from a base station, an indication representing whether a RS is a target of a unified TCI indicated by DCI. The cellular base band processor 1104 may further include means for communicating, with the base station, based on the indication. The cellular base band processor 1104 may further include means for receiving, from a base station, a QCL indication for a downlink DL RS. The cellular base band processor 1104 may further include means for receiving an indication indicating spatial filter information to an UL RS. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
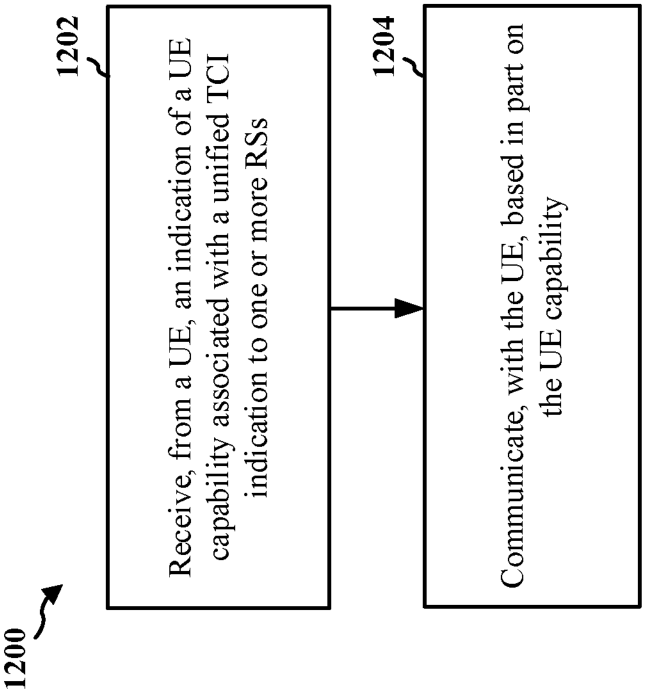
FIG. 12 is a flowchart of a method of wireless communication.

FIG. 12 is a flowchart 1200 of a method of wireless communication. The method may be performed by a base station (e.g., the base station 152/180, the base station 402, the base station 504; the apparatus 1602). The method may be used for QCL indication to RS to improve communication quality between a UE and a UE.

At 1202, the base station may receive, from a UE, an indication of a UE capability associated with a unified TCI indication to one or more RSs. For example, the base station 504 may receive, from a UE 502, an indication of a UE capability 506 associated with a unified TCI indication to one or more RSs. In some aspects, 1202 may be performed by indication component 1642 in FIG. 16.

At 1204, the base station may communicate, with the UE, based in part on the UE capability. For example, the base station 504 may communicate, with the UE 502, based in part on the UE capability. In some aspects, 1204 may be performed by communication component 1644 in FIG. 16. For example, the base station may transmit indications to the UE based on the UE capability.

Figure 13:
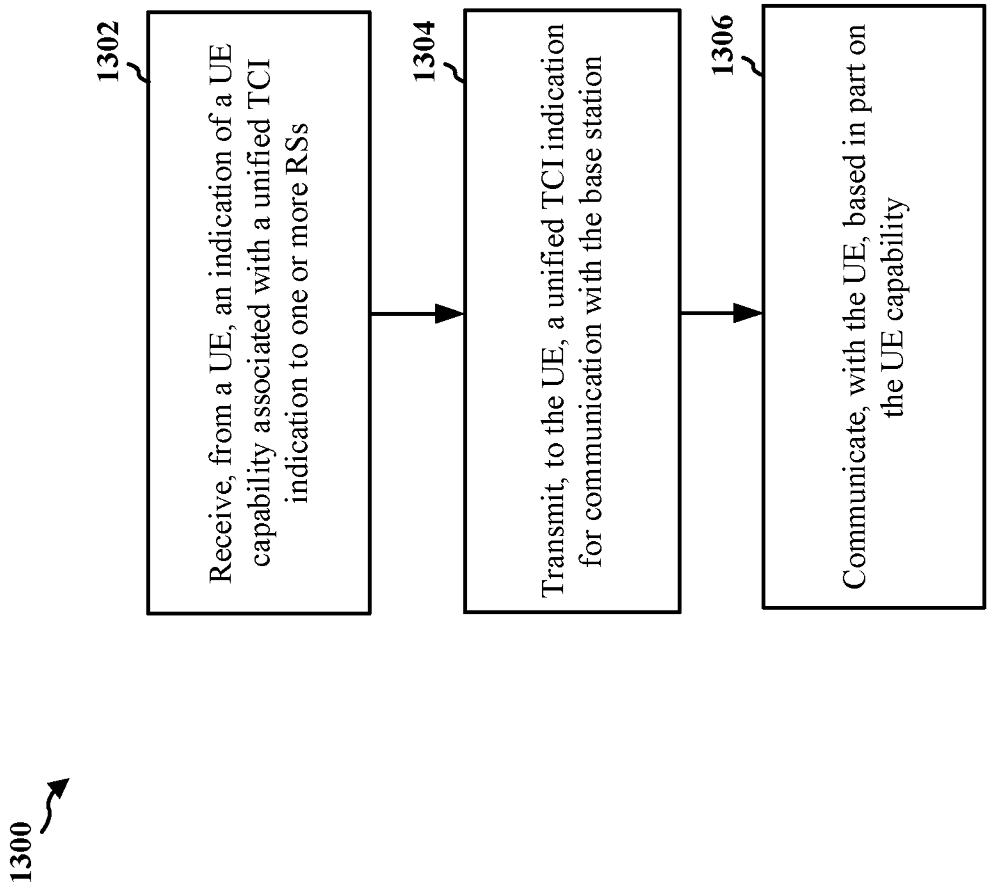
FIG. 13 is a flowchart of a method of wireless communication.

FIG. 13 is a flowchart 1300 of a method of wireless communication. The method may be performed by a base station (e.g., the base station 152/180, the base station 402, the base station 504; the apparatus 1202). The method may be used for QCL indication to RS to improve communication quality between a base station and a UE.

At 1302, the base station may receive, from a UE, an indication of a UE capability associated with a unified TCI indication to one or more RSs. For example, the base station 504 may receive, from a UE 502, an indication of a UE capability 506 associated with a unified TCI indication to one or more RSs. In some aspects, 1302 may be performed by indication component 1642 in FIG. 16. In some aspects, the indication indicates whether the UE supports a downlink RS sharing a same indicated TCI state for UE-dedicated reception on PDSCH and UE-dedicated reception on a subset of CORESETs in a CC. In some aspects, the downlink RS is associated with one or more of: a set of CSI-RS resources for CSI acquisition configured without a higher layer parameter or higher layer repetition, a set of CSI-RS resources for beam management configured without higher layer parameter or higher layer repetition, a set of CSI-RS resources for tracking configured with a higher layer parameter, or a DM-RS associated with non-UE-dedicated reception on PDSCH and the subset of CORESETs. In some aspects, the indication indicates whether the UE supports SRS resources for beam management that share a same TCI state with dynamic grant or configured grant based PUSCH or a subset of PUCCH resources in a component carrier. In some aspects, the UE capability is associated with one RS type. In some aspects, the UE capability is associated with more than one RS type. In some aspects, the UE capability indicates non-support, and wherein the UE is not indicated with a unified TCI to the RS via DCI.

At 1304, the base station may transmit, to the UE, a unified TCI indication for communication with the UE. For example, the base station 504 may transmit, to the UE 502, a unified TCI indication for communication with the UE, and the UE may communicate, with the UE, based on the unified TCI indication. In some aspects, 1304 may be performed by indication component 1642 in FIG. 16.

At 1306, the base station may communicate, with the UE, based in part on the UE capability. For example, the base station 504 may communicate, with the UE 502, based in part on the UE capability. In some aspects, 1306 may be performed by communication component 1644 in FIG. 16.

Figure 14:
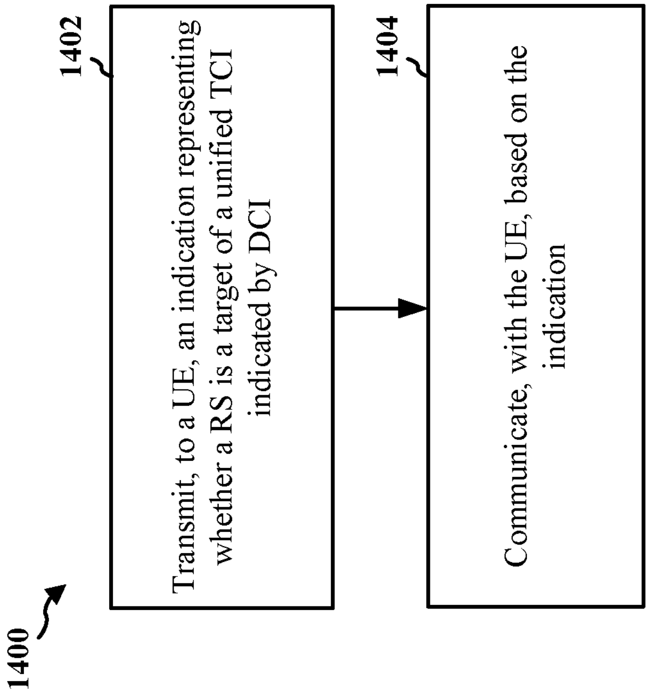
FIG. 14 is a flowchart of a method of wireless communication.

FIG. 14 is a flowchart 1400 of a method of wireless communication. The method may be performed by a base station (e.g., the base station 152/180, the base station 402, the base station 504; the apparatus 1602). The method may be used for indicating whether a RS is a target of a unified TCI to improve communication quality between a UE and a base station.

At 1402, the base station may transmit, to a UE, an indication representing whether a RS is a target of a unified TCI indicated by DCI. For example, the base station 504 may transmit, to a UE 502, an indication in DCI 508 representing whether a RS is a target of a unified TCI indicated by DCI. In some aspects, 1402 may be performed by indication component 1642 in FIG. 16.

At 1404, the base station may communicate, with the UE, based on the indication. For example, the base station 504 may communicate, with the UE 502, based on the indication. In some aspects, 1404 may be performed by communication component 1644 in FIG. 16.

Figure 15:
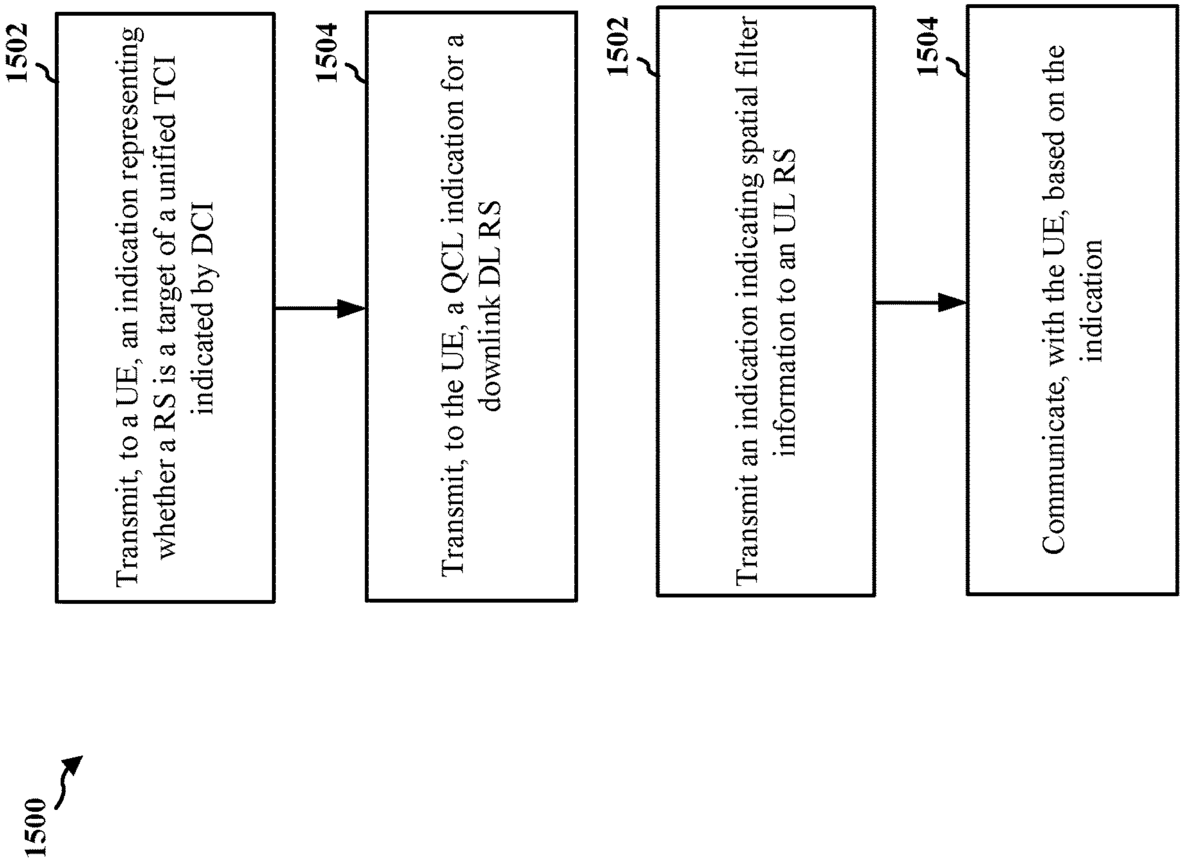
FIG. 15 is a flowchart of a method of wireless communication.

FIG. 15 is a flowchart 1500 of a method of wireless communication. The method may be performed by a base station (e.g., the base station 152/180, the base station 402, the base station 504; the apparatus 1602). The method may be used for indicating whether a RS is a target of a unified TCI to improve communication quality between a UE and a base station.

At 1502, the base station may transmit, to a UE, an indication representing whether a RS is a target of a unified TCI indicated by DCI. For example, the base station 504 may transmit, to a UE 502, an indication in DCI 508 representing whether a RS is a target of a unified TCI indicated by DCI. In some aspects, 1502 may be performed by indication component 1642 in FIG. 16. In some aspects, the indication includes a unified TCI indication field in the DCI. In some aspects, the RS includes a set of CSI-RS resources for CSI acquisition configured without higher layer parameter or higher layer repetition. In some aspects, the RS includes a set of CSI-RS resources for beam management configured without higher layer parameter or higher layer repetition. In some aspects, the RS includes a set of CSI-RS resources for tracking configured with a higher layer parameter. In some aspects, the RS includes DM-RS associated with non-UE-dedicated reception on PDSCH and the subset of CORESETs. In some aspects, the RS includes SRS resources for beam management. In some aspects, the indication is transmitted via MAC-CE.

At 1504, the base station may transmit, to a UE, a QCL indication for a downlink DL RS. For example, the base station 504 may transmit, to the UE 502, a QCL indication 510 for a downlink DL RS. In some aspects, 1504 may be performed by indication component 1642 in FIG. 16. In some aspects, the indication is included in a dedicated RRC signaling for periodic CSI-RS resources, the DL RS being the periodic CSI-RS. In some aspects, the indication is included in a dedicated MAC-CE signaling for semi-periodic CSI-RS resources, the DL RS being the semi-periodic CSI-RS. In some aspects, the indication includes a CSI trigger state selected by a CSI-request field in DCI signalling for aperiodic CSI-RS resources, the DL RS being the aperiodic CSI-RS. In some aspects, the indication includes a TCI indication by a unified TCI indication field in DCI for UE-dedicated reception on PDSCH and for UE-dedicated reception on all or subset of CORESETs in a CC. In some aspects, a format of the indication is based on a RRC configuration, a time domain configuration, or a UE capability.

At 1506, the base station may receive an indication indicating spatial filter information to an UL RS. For example, the base station 504 may receive an indication indicating spatial filter information 512 to an UL RS. In some aspects, 1506 may be performed by indication component 1642 in FIG. 16. In some aspects, the indication is included in a dedicated RRC signaling for periodic CSI-RS resources, the UL RS being the periodic CSI-RS. In some aspects, the indication is included in a dedicated MAC-CE signaling for semi-periodic CSI-RS resources, the UL RS being the semi-periodic CSI-RS. In some aspects, the indication is included in a dedicated MAC-CE signaling for aperiodic CSI-RS resources, the UL RS being the aperiodic CSI-RS. In some aspects, the indication includes a TCI state ID or a spatial RS ID. In some aspects, the indication includes a TCI indication by a unified TCI indication field in DCI for UE-dedicated reception on PUSCH and for UE-dedicated reception on all or subset of CORESETs in a CC. In some aspects, a format of the indication is based on a RRC configuration, a time domain configuration, or a UE capability.

At 1508, the base station may communicate, with the UE, based on the indication. For example, the base station 504 may communicate, with the UE 502, based on the indication. In some aspects, 1508 may be performed by communication component 1644 in FIG. 16. For example, the base station may receive communications from the UE based on processed TCI states.

Figure 16:
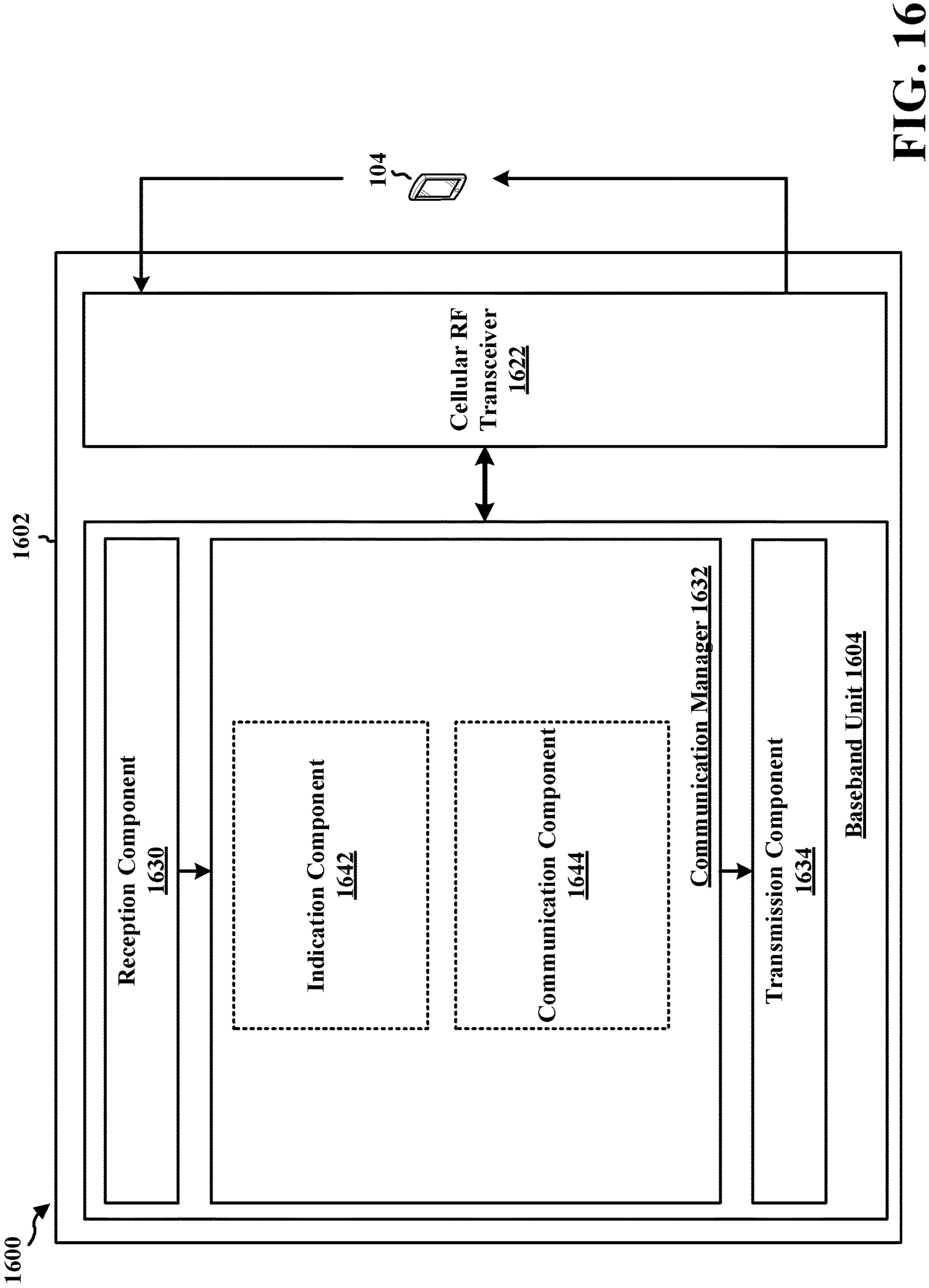
FIG. 16 is a diagram illustrating an example of a hardware implementation for an example apparatus.

FIG. 16 is a diagram 1600 illustrating an example of a hardware implementation for an apparatus 1602. The apparatus 1602 may be a base station, a component of a base station, or may implement base station functionality. In some aspects, the apparatus 1002 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 may include an indication component 1642 that is configured to receive or transmit an indication, e.g., as described in connection with 1202 in FIGS. 12, 1302 and 1304 in FIG. 13, 1402 in FIG. 14, and 1502, 1504, and 1506 in FIG. 15. The communication manager 1632 may further include a communication component 1644 that may be configured to communicate with a UE based on the indication, e.g., as described in connection with 1204 in FIG. 12, 1306 in FIG. 13, 1404 in FIG. 14, and 1508 in FIG. 15.

The apparatus may include additional components that perform each of the blocks of the algorithm in the flowcharts of FIGS. 12-15. As such, each block in the flowcharts of FIGS. 12-15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, may include means for receiving, from a UE, an indication of a UE capability associated with a unified TCI indication to one or more RSs. The baseband unit 1604 may further include means for communicating, with the UE, based in part on the UE capability. The baseband unit 1604 may further include means for transmitting, to the UE, a unified TCI indication for communication with the UE. The baseband unit 1604 may further include means for transmitting, to a UE, an indication representing whether a RS is a target of a unified TCI indicated by DCI. The baseband unit 1604 may further include means for communicating, with the UE, based on the indication. The baseband unit 1604 may further include means for transmitting, to a UE, a QCL indication for a downlink DL RS. The baseband unit 1604 may further include means for transmitting an indication indicating spatial filter information to an UL RS. The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, comprising: a memory; and at least one processor coupled to the memory and configured to: transmit, to a base station, an indication of a UE capability associated with a unified TCI indication to one or more RSs; and communicate, with the base station, based in part on the UE capability.

Aspect 2 is the apparatus of aspect 1, wherein the indication indicates support for the unified TCI indication to one or more RSs, and at least one processor is further configured to: receive, from the base station, a unified TCI indication for communication with the base station, and the UE communicates, with the base station, based on the unified TCI indication.

Aspect 3 is the apparatus of any of aspects 1-2, wherein the indication indicates whether the UE supports a downlink RS sharing a same indicated TCI state for UE-dedicated reception on PDSCH and UE-dedicated reception on a subset of CORESETs in a CC.

Aspect 4 is the apparatus of any of aspects 1-3, wherein a downlink RS of the one or more RSs is associated with one or more of: a set of CSI-RS resources for CSI acquisition configured without a higher layer parameter or higher layer repetition, a set of CSI-RS resources for beam management configured without higher layer parameter or higher layer repetition, a set of CSI-RS resources for tracking configured with a higher layer parameter, or a DM-RS associated with non-UE-dedicated reception on PDSCH and a subset of CORESETs.

Aspect 5 is the apparatus of any of aspects 1-4, wherein the indication indicates whether the UE supports SRS resources for beam management that share a same TCI state with dynamic grant or configured grant based PUSCH or a subset of PUCCH resources in a component carrier.

Aspect 6 is the apparatus of any of aspects 1-5, wherein the UE capability is associated with one RS type.

Aspect 7 is the apparatus of any of aspects 1-6, wherein the UE capability is associated with more than one RS type.

Aspect 8 is the apparatus of any of aspects 1-7, wherein the UE capability indicates non-support, and wherein the UE is not indicated with a unified TCI to the one or more RSs via DCI.

Aspect 9 is an apparatus for wireless communication at a UE, comprising: a memory; and at least one processor coupled to the memory and configured to: receive, from a base station, an indication representing whether a RS is a target of a unified TCI indicated by DCI; and communicate, with the base station, based on the indication.

Aspect 10 is the apparatus of aspect 9, wherein the indication comprises in a unified TCI indication field in the DCI.

Aspect 11 is the apparatus of any of aspects 9-10, wherein the RS comprises a set of CSI-RS resources for CSI acquisition configured without higher layer parameter or higher layer repetition.

Aspect 12 is the apparatus of any of aspects 9-11, wherein the RS comprises a set of CSI-RS resources for beam management configured without higher layer parameter or higher layer repetition.

Aspect 13 is the apparatus of any of aspects 9-12, wherein the RS comprises a set of CSI-RS resources for tracking configured with a higher layer parameter.

Aspect 14 is the apparatus of any of aspects 9-13, wherein the RS comprises DM-RS associated with non-UE-dedicated reception on PDSCH and a subset of CORESETs.

Aspect 15 is the apparatus of any of aspects 9-14, wherein the RS comprises SRS resources for beam management.

Aspect 16 is the apparatus of any of aspects 9-15, wherein the indication is transmitted via radio RRC signalling.

Aspect 17 is the apparatus of any of aspects 9-16, wherein the indication is transmitted via MAC-CE.

Aspect 18 is the apparatus of any of aspects 9-17, wherein the at least one processor is configured to: receive, from the base station, a QCL indication for a DL RS.

Aspect 19 is the apparatus of any of aspects 9-18, wherein the indication is comprised in a dedicated radio RRC signaling for periodic CSI-RS resources, the DL RS being the periodic CSI-RS.

Aspect 20 is the apparatus of any of aspects 9-19, wherein the indication is comprised in a dedicated MAC-CE signaling for semi-periodic CSI-RS resources, the DL RS being the semi-periodic CSI-RS.

Aspect 21 is the apparatus of any of aspects 9-20, wherein the indication comprises a CSI trigger state selected by a CSI-request field in DCI signalling for aperiodic CSI-RS resources, the DL RS being the aperiodic CSI-RS.

Aspect 22 is the apparatus of any of aspects 9-21, wherein the indication comprises a TCI indication by a unified TCI indication field in DCI for UE-dedicated reception on PDSCH and for UE-dedicated reception on all or subset of CORESETs in a CC.

Aspect 23 is the apparatus of any of aspects 9-22, wherein a format of the indication is based on a radio RRC configuration, a time domain configuration, or a UE capability.

Aspect 24 is the apparatus of any of aspects 9-23, wherein the at least one processor is further configured to: receive an indication indicating spatial filter information to an UL RS.

Aspect 25 is the apparatus of any of aspects 9-24, wherein the indication is comprised in a dedicated radio RRC signaling for periodic CSI-RS resources, the UL RS being the periodic CSI-RS.

Aspect 26 is the apparatus of any of aspects 9-25, wherein the indication is comprised in a dedicated MAC-CE signaling for semi-periodic CSI-RS resources, the UL RS being the semi-periodic CSI-RS.

Aspect 27 is the apparatus of any of aspects 9-26, wherein the indication is comprised in a dedicated MAC-CE signaling for aperiodic CSI-RS resources, the UL RS being the aperiodic CSI-RS.

Aspect 28 is the apparatus of any of aspects 9-27, wherein the indication comprises a TCI state ID or a spatial RS ID.

Aspect 29 is the apparatus of any of aspects 9-28, wherein the indication comprises a TCI indication by a unified TCI indication field in DCI for UE-dedicated reception on PUSCH and for UE-dedicated reception on all or subset of CORESETs in a CC.

Aspect 30 is the apparatus of any of aspects 9-29, wherein a format of the indication is based on a RRC configuration, a time domain configuration, or a UE capability.

Aspect 31 is an apparatus for wireless communication at a base station, comprising: a memory; and at least one processor coupled to the memory and configured to: receive, from a UE, an indication of a UE capability associated with a unified TCI indication to one or more RSs; and communicate, with the UE, based in part on the UE capability.

Aspect 32 is the apparatus of aspect 31, wherein the indication indicates support for the unified TCI indication to one or more RSs, and at least one processor is further configured to: transmit, to the UE, a unified TCI indication for communication with the base station, and the UE communicates, with the base station, based on the unified TCI indication.

Aspect 33 is the apparatus of any of aspects 31-32, wherein the indication indicates whether the UE supports a downlink RS sharing a same indicated TCI state for UE-dedicated reception on PDSCH and UE-dedicated reception on a subset of CORESETs in a CC.

Aspect 34 is the apparatus of any of aspects 31-33, wherein a downlink RS of the one or more RSs is associated with one or more of: a set of CSI-RS resources for CSI acquisition configured without a higher layer parameter or higher layer repetition, a set of CSI-RS resources for beam management configured without higher layer parameter or higher layer repetition, a set of CSI-RS resources for tracking configured with a higher layer parameter, or a DM-RS associated with non-UE-dedicated reception on PDSCH and a subset of CORESETs.

Aspect 35 is the apparatus of any of aspects 31-34, wherein the indication indicates whether the UE supports SRS resources for beam management that share a same TCI state with dynamic grant or configured grant based PUSCH or a subset of PUCCH resources in a component carrier.

Aspect 36 is the apparatus of any of aspects 31-35, wherein the UE capability is associated with one RS type.

Aspect 37 is the apparatus of any of aspects 31-36, wherein the UE capability is associated with more than one RS type.

Aspect 38 is the apparatus of any of aspects 31-37, wherein the UE capability indicates non-support, and wherein the UE is not indicated with a unified TCI to the one or more RSs via DCI.

Aspect 39 is an apparatus for wireless communication at a base station, comprising: a memory; and at least one processor coupled to the memory and configured to: transmit, to a UE, an indication representing whether a RS is a target of a unified TCI indicated by DCI; and communicate, with the UE, based on the indication.

Aspect 40 is the apparatus of aspect 39, wherein the indication comprises in a unified TCI indication field in the DCI.

Aspect 41 is the apparatus of any of aspects 39-40, wherein the RS comprises a set of CSI-RS resources for CSI acquisition configured without higher layer parameter or higher layer repetition.

Aspect 42 is the apparatus of any of aspects 39-41, wherein the RS comprises a set of CSI-RS resources for beam management configured without higher layer parameter or higher layer repetition.

Aspect 43 is the apparatus of any of aspects 39-42, wherein the RS comprises a set of CSI-RS resources for tracking configured with a higher layer parameter.

Aspect 44 is the apparatus of any of aspects 39-43, wherein the RS comprises DM-RS associated with non-UE-dedicated reception on PDSCH and a subset of CORESETs.

Aspect 45 is the apparatus of any of aspects 39-44, wherein the RS comprises SRS resources for beam management.

Aspect 46 is the apparatus of any of aspects 39-45, wherein the indication is transmitted via radio RRC signalling.

Aspect 47 is the apparatus of any of aspects 39-46, wherein the indication is transmitted via MAC-CE.

Aspect 48 is the apparatus of any of aspects 39-47, wherein the at least one processor is configured to: transmit, to the UE, a QCL indication for a DL RS.

Aspect 49 is the apparatus of any of aspects 39-48, wherein the indication is comprised in a dedicated radio RRC signaling for periodic CSI-RS resources, the DL RS being the periodic CSI-RS.

Aspect 50 is the apparatus of any of aspects 39-49, wherein the indication is comprised in a dedicated MAC-CE signaling for semi-periodic CSI-RS resources, the DL RS being the semi-periodic CSI-RS.

Aspect 51 is the apparatus of any of aspects 39-50, wherein the indication comprises a CSI trigger state selected by a CSI-request field in DCI signalling for aperiodic CSI-RS resources, the DL RS being the aperiodic CSI-RS.

Aspect 52 is the apparatus of any of aspects 39-51, wherein the indication comprises a TCI indication by a unified TCI indication field in DCI for UE-dedicated reception on PDSCH and for UE-dedicated reception on all or subset of CORESETs in a CC.

Aspect 53 is the apparatus of any of aspects 39-52, wherein a format of the indication is based on a radio RRC configuration, a time domain configuration, or a UE capability.

Aspect 54 is the apparatus of any of aspects 39-53, wherein the at least one processor is further configured to: transmit an indication indicating spatial filter information to an UL RS.

Aspect 55 is the apparatus of any of aspects 39-54, wherein the indication is comprised in a dedicated radio RRC signaling for periodic CSI-RS resources, the UL RS being the periodic CSI-RS.

Aspect 56 is the apparatus of any of aspects 39-55, wherein the indication is comprised in a dedicated MAC-CE signaling for semi-periodic CSI-RS resources, the UL RS being the semi-periodic CSI-RS.

Aspect 57 is the apparatus of any of aspects 39-56, wherein the indication is comprised in a dedicated MAC-CE signaling for aperiodic CSI-RS resources, the UL RS being the aperiodic CSI-RS.

Aspect 58 is the apparatus of any of aspects 39-57, wherein the indication comprises a TCI state ID or a spatial RS ID.

Aspect 59 is the apparatus of any of aspects 39-58, wherein the indication comprises a TCI indication by a unified TCI indication field in DCI for UE-dedicated reception on PUSCH and for UE-dedicated reception on all or subset of CORESETs in a CC.

Aspect 60 is the apparatus of any of aspects 39-59, wherein a format of the indication is based on a RRC configuration, a time domain configuration, or a UE capability.

Aspect 61 is a method of wireless communication for implementing any of aspects 1 to 8.

Aspect 62 is an apparatus for wireless communication including means for implementing any of aspects 1 to 8.

Aspect 63 is a computer-readable medium storing computer executable code, where the code when executed by a processor causes the processor to implement any of aspects 1 to 8.

Aspect 64 is a method of wireless communication for implementing any of aspects 9 to 30.

Aspect 65 is an apparatus for wireless communication including means for implementing any of aspects 9 to 30.

Aspect 66 is a computer-readable medium storing computer executable code, where the code when executed by a processor causes the processor to implement any of aspects 9 to 30.

Aspect 67 is a method of wireless communication for implementing any of aspects 31 to 38.

Aspect 68 is an apparatus for wireless communication including means for implementing any of aspects 31 to 38.

Aspect 69 is a computer-readable medium storing computer executable code, where the code when executed by a processor causes the processor to implement any of aspects 31 to 38.

Aspect 70 is a method of wireless communication for implementing any of aspects 39 to 60.

Aspect 71 is an apparatus for wireless communication including means for implementing any of aspects 39 to 60.

Aspect 72 is a computer-readable medium storing computer executable code, where the code when executed by a processor causes the processor to implement any of aspects 39 to 60.

What is claimed is:

1. An apparatus for wireless communication at a user equipment (UE), comprising:

memory; and at least one processor coupled to the memory and configured to:

transmit, to a base station, an indication of a UE capability associated with a unified transmission configuration indicator (TCI) indication to one or more reference signals (RSs), wherein the indication indicates:

whether the UE supports a downlink RS sharing a same indicated TCI state for UE-dedicated reception on physical downlink shared channel (PDSCH) and UE-dedicated reception on a subset of control resource sets (CORESETs) in a first component carrier (CC), or whether the UE supports sounding reference signal (SRS) resources for beam management that share another same TCI state with dynamic grant or configured grant based physical uplink shared channel (PUSCH) or a subset of physical uplink control channel (PUCCH) resources in a second component carrier; and communicate, with the base station, based in part on the UE capability.

2. The apparatus of claim 1, wherein the indication indicates support for the unified TCI indication to one or more RSs, and wherein the at least one processor is further configured to:

receive, from the base station, a unified TCI indication for communication with the base station, and the UE communicates, with the base station, based on the unified TCI indication.

3. The apparatus of claim 1, wherein the indication indicates whether the UE supports the downlink RS sharing the same indicated TCI state for the UE-dedicated reception on the PDSCH and the UE-dedicated reception on the subset of CORESETs in the first CC.

4. The apparatus of claim 1, wherein a downlink RS of the one or more RSs is associated with one or more of:

a set of channel state information (CSI)-RS resources for CSI acquisition configured without a higher layer parameter or higher layer repetition, a set of CSI-RS resources for the beam management configured without the higher layer parameter or the higher layer repetition, a set of CSI-RS resources for tracking configured with the higher layer parameter, or a demodulation (DM)-RS associated with non-UE-dedicated reception on the PDSCH and a subset of CORESETs.

5. The apparatus of claim 1, wherein the indication indicates whether the UE supports the SRS for the beam management that share the another same TCI state with the dynamic grant or configured grant based PUSCH or the subset of PUCCH resources in the second component carrier.

6. The apparatus of claim 1, wherein the UE capability is associated with one RS type.

7. The apparatus of claim 1, wherein the UE capability is associated with more than one RS type.

8. The apparatus of claim 1, wherein the UE capability indicates non-support, and wherein the UE is not indicated with a unified TCI to the one or more RSs via downlink control information (DCI).

9. An apparatus for wireless communication at a user equipment (UE), comprising:

memory; and at least one processor coupled to the memory and configured to:

receive, from a base station, an indication representing whether a reference signal (RS) is a target of a unified transmission configuration indicator (TCI) indicated by downlink control information (DCI), wherein a format of the indication is based on a radio resource control (RRC) configuration, a time domain configuration, or a UE capability; and communicate, with the base station, based on the indication.

10. The apparatus of claim 9, wherein the indication comprises in a unified TCI indication field in the DCI.

11. The apparatus of claim 9, wherein the RS comprises a set of channel state information (CSI)-RS resources for CSI acquisition configured without higher layer parameter or higher layer repetition.

12. The apparatus of claim 9, wherein the RS comprises a set of CSI-RS resources for beam management configured without higher layer parameter or higher layer repetition.

13. The apparatus of claim 9, wherein the RS comprises a set of CSI-RS resources for tracking configured with a higher layer parameter.

14. The apparatus of claim 9, wherein the RS comprises demodulation (DM)-RS associated with non-UE-dedicated reception on PDSCH and a subset of control resource sets (CORESETs).

15. The apparatus of claim 9, wherein the RS comprises sounding reference signal (SRS) resources for beam management.

16. The apparatus of claim 9, wherein the indication is configured to be transmitted via RRC signalling.

17. The apparatus of claim 9, wherein the indication is configured to be transmitted via medium access control (MAC) control element (CE) (MAC-CE).

18. The apparatus of claim 9, wherein the at least one processor is configured to:

receive, from the base station, a quasi-colocation (QCL) indication for a downlink (DL) RS.

19. The apparatus of claim 18, wherein the indication is comprised in a dedicated RRC signaling for periodic channel state information reference signal (CSI-RS) resources, the DL RS being the periodic CSI-RS.

20. The apparatus of claim 18, wherein the indication is comprised in a dedicated medium access control (MAC) control element (CE) (MAC-CE) signaling for semi-periodic channel state information reference signal (CSI-RS) resources, the DL RS being the semi-periodic CSI-RS.

21. The apparatus of claim 18, wherein the indication comprises a channel state information (CSI) trigger state selected by a CSI-request field in DCI signalling for aperiodic CSI-RS resources, the DL RS being the aperiodic CSI-RS.

22. The apparatus of claim 18, wherein the indication comprises a TCI indication by a unified TCI indication field in the DCI for UE-dedicated reception on physical downlink shared channel (PDSCH) and for UE-dedicated reception on all or subset of control resource sets (CORESETs) in a component carrier (CC).

23. The apparatus of claim 9, wherein the at least one processor is further configured to:

receive an additional indication indicating spatial filter information to an uplink (UL) RS.

24. The apparatus of claim 23, wherein the indication is comprised in a dedicated radio resource control (RRC) signaling for periodic channel state information reference signal (CSI-RS) resources, the UL RS being the periodic CSI-RS.

25. The apparatus of claim 23, wherein the indication is comprised in a dedicated medium access control (MAC) control element (CE) (MAC-CE) signaling for semi-periodic channel state information reference signal (CSI-RS) resources, the UL RS being the semi-periodic CSI-RS.

26. The apparatus of claim 23, wherein the indication is comprised in a dedicated medium access control (MAC) control element (CE) (MAC-CE) signaling for aperiodic channel state information reference signal (CSI-RS) resources, the UL RS being the aperiodic CSI-RS.

27. The apparatus of claim 23, wherein the indication comprises a TCI state identifier (ID) or a spatial RS ID.

28. The apparatus of claim 23, wherein the indication comprises a TCI indication by a unified TCI indication field in the DCI for UE-dedicated reception on physical uplink shared channel (PUSCH) and for UE-dedicated reception on all or subset of control resource sets (CORESETs) in a component carrier (CC).

* * * * *